United States Patent
Strassner et al.

(10) Patent No.: US 12,095,630 B2
(45) Date of Patent: Sep. 17, 2024

(54) AGREEMENT TO SERVICE POLICY TRANSLATION SYSTEM

(71) Applicant: HUAWEI TECHNOLOGIES CO., LTD., Shenzhen (CN)

(72) Inventors: John Charles Strassner, Gilroy, CA (US); Alexander Clemm, Los Gatos, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/454,021

(22) Filed: Aug. 22, 2023

(65) Prior Publication Data

US 2023/0396518 A1    Dec. 7, 2023

Related U.S. Application Data

(63) Continuation of application No. PCT/US2021/027373, filed on Apr. 14, 2021.

(Continued)

(51) Int. Cl.
| | |
|---|---|
| *H04L 41/5009* | (2022.01) |
| *H04L 41/5019* | (2022.01) |
| *H04L 43/091* | (2022.01) |

(52) U.S. Cl.
CPC ...... *H04L 41/5009* (2013.01); *H04L 41/5019* (2013.01); *H04L 43/091* (2022.05)

(58) Field of Classification Search
None
See application file for complete search history.

(56) References Cited

U.S. PATENT DOCUMENTS 6,701,342 B1    3/2004  Bartz et al.
2010/0257007 A1*  10/2010  Chan .................. G06Q 10/063
                                                  705/7.11

(Continued)

FOREIGN PATENT DOCUMENTS

WO        2020030039       2/2020

OTHER PUBLICATIONS

International Preliminary Report on Patentability dated Sep. 7, 2023, International Application No. PCT/US2021/027373.

(Continued)

*Primary Examiner* — June Sison
(74) *Attorney, Agent, or Firm* — Vierra Magen Marcus LLP

(57) ABSTRACT

According to one aspect of the present disclosure, a system is provided which allows a network service provider to address providing service assurances to comply with each service level agreement (SLA) agreed to with customers. A translation system accesses one or more network service agreements and parses the one or more network service agreements into a processing format. The system then determines which network services are specified by the network service agreement, and determines service level agreements for each service. The translation system then generates one or more service level objectives for each service level agreement and one or more service level values for each service level objective. One or more metrics are then selected to be associated with each value to be measured to determine compliance with the service level agreement. The system then stores each of the service level agreements, objectives, values and metrics as objects.

20 Claims, 16 Drawing Sheets

Related U.S. Application Data

(60) Provisional application No. 63/152,762, filed on Feb. 23, 2021, provisional application No. 63/152,760, filed on Feb. 23, 2021.

(56) References Cited

U.S. PATENT DOCUMENTS

| | | | |
|---|---|---|---|
| 2010/0275179 A1* | 10/2010 | Mengusoglu | G06F 40/205 |
| | | | 717/104 |
| 2020/0052979 A1* | 2/2020 | Clemm | H04L 41/5019 |
| 2020/0396320 A1* | 12/2020 | Clemm | H04L 47/00 |
| 2021/0051080 A1 | 2/2021 | Engel et al. | |
| 2021/0081836 A1* | 3/2021 | Polleri | G06F 16/9035 |
| 2021/0184944 A1 | 6/2021 | Clemm et al. | |
| 2023/0396517 A1* | 12/2023 | Clemm | H04L 41/5009 |

OTHER PUBLICATIONS

International Preliminary Report on Patentability dated Sep. 7, 2023, International Application No. PCT/US2021/027372.
International Search Report and Written Opinion dated Oct. 28, 2021, International Application No. PCT/US2021/027373.
Rodrigues, Carlos et al., "An ontology for managing network services quality", Expert Systems with Applications, vol. 39, No. 9, Feb. 8, 2012, pp. 7938-7946.
Kritikos, Kyriakos et al., "Semantic SLAs for Services with Q-SLA", Procedia Computer Science, vol. 97, Oct. 17, 2016, pp. 24-33.
Clemm et al., "Adaptive Service Level Accounting System", U.S. Appl. No. 18/454,019, filed Aug. 22, 2023.
International Search Report and Written Opinion dated Oct. 27, 2021, International Application No. PCT/US2021/027372.
Francois, Jerome et al., "BPP over P4: Exploring Frontiers and Limits in Programmable Packet Processing", IEEE Global Communications Conference, Dec. 2020, pp. 1-7.
Huawei Technologies Co., Ltd. "A Brief Introduction about New IP Research Initiative", Dec. 10, 2020, pp. 1-6.
Li, Richard et al., "A Framework for Qualitative Communications Using Big Packet Protocol", 2nd Workshop on Networking for Emerging Applications and Technologies, Aug. 19, 2019, pp. 1-28.
Non-Final Office Action dated Jan. 5, 2024, U.S. Appl. No. 18/454,019, 35 pages.
Response to Non-Final Office Action dated Apr. 5, 2024, U.S. Appl. No. 18/454,019, 10 pages.
Final Office Action dated Apr. 26, 2024, U.S. Appl. No. 18/454,019, 25 pages.
Response to Final Office Action dated Jul. 23, 2024, U.S. Appl. No. 18/454,019, 11 pages.

* cited by examiner

```
NewIP-BPP Template "InTimeAccounting";

Meta    item "lat" len 2 init 0;
        item "slo" len 2 init $$n

Cmd 1:  cond: -;
        action: update-latency(par.meta "lat");
Cmd 2:  cond: egress; ANDTHEN
               (gt (par.meta "lat", par.meta "slo")
        action: incr(par.stlt offset 0 len 4); break;
Cmd 3:  cond: egress;
        action: incr(par.stlt offset 4 len 4);
```

*FIG. 5A*

```
NewIP-BPP Contract;

Cmd: next=true; serial=true;
  cond: -;
  action: update-latency(par.meta offset 0 len 2);
Cmd: next=true; serial=false;
  cond: egress; ANDTHEN (gt22 (par.meta offset 0, par.meta offset 2)
  action: incr(par.stlt offset 4 len 4);
  action: break;
Cmd: next=false; serial=dc;
  cond: egress; -
  action: incr(par.stlt offset 4 len 4);
Meta  item "lat" offset 0 len 2 init 0;
      item "slo" offset 2 len 2 fix 30;
```

| 00 | | | 07 | 08 | | | | 15 | 16 | | | 23 | 24 | | | 31 |
|---|---|---|---|---|---|---|---|---|---|---|---|---|---|---|---|---|
| Cmd header 610 | | | | | Action "update-latency" 620 | | | | | | | | | | | |
| p 0 | len 5 | n 1 | s 1 | c 0 | p 0 | action Update latency | | | | len 4 | n 00 | r 0 | np 1 | sp1 1 | sl1 10 (meta) | |
| Action (cont'd.) | | | | | Command header 630 | | | | | | | | | | | |
| p 0 | parameter 0 | | | | | | | action update latency | | | n 1 | s 0 | c 1 | np 1 | len 2 | np 0 |
| | | | | | | | | | | Condition 635 | | | | | | |
| p 0 | ctype gt22 | | | | | n 0 | c 00 | len 4 | np 2 | sp1 2 | sl1 01 (meta) | ctype egress | | | | |
| | | | | | | | | | Action "increment" 640 | | | | | | | |
| p 0 | action incr4 | | | | | n 10 | r 0 | len 4 | np 1 | spn 2 | sln 00 (value) | n 0 | c 10 | len 2 | parameter 0 (offset) | parameter 2 (offset) |
| | | | | | | | | | Action "break" 645 | | | | | | | |
| p 0 | action break | | | | | n 00 | r 0 | len 3 | np 0 | sp1 11 | sl1 01 (stlt) | | | parameter 0 (stlt offset) | | |
| | | | | | | | | | | Cond 655 | | | | Command header 650 | | |
| p 0 | ctype egress | | | | | n 0 | c 10 | len 2 | parameter 4 (stlt offset) | sp1 0 | sl1 0 | | | len 10 | n 0 | s 0 c 1 |
| | | | | | | | | | Action "increment" contd | | | | Action "increment" 660 | | |
| p 0 | np 1 | sp1 11 | sl1 01 (stlt) | | | | | | | | | action incr4 | | len 4 | n 00 | r 0 |
| | | | | | | | | | Metadata 680 | | | | 670 Metadata | | | |
| | | | | | | | | | 30 (SLO) | | | | 0 (latency) | | | |

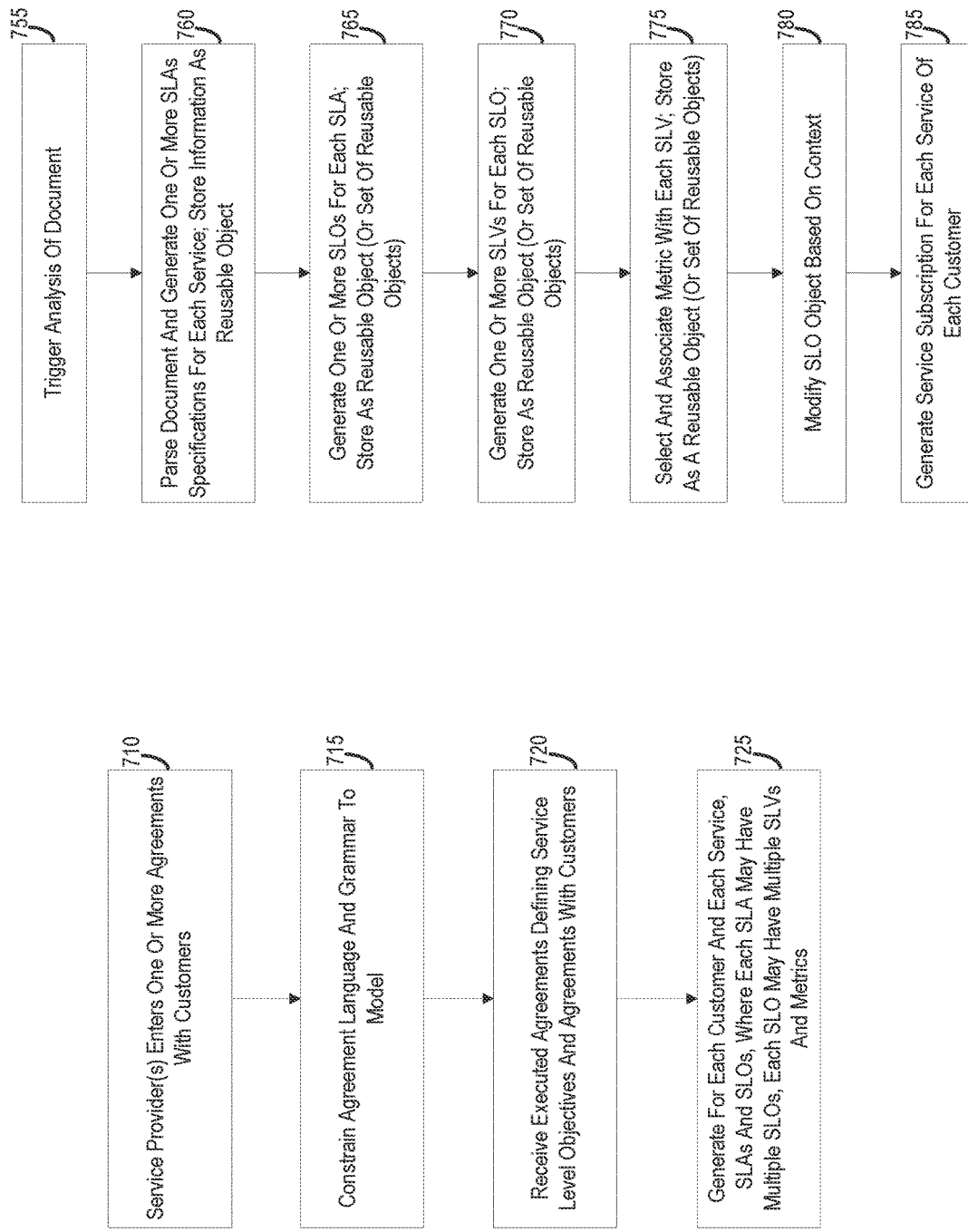

AGREEMENT TO SERVICE POLICY TRANSLATION SYSTEM

CLAIM OF PRIORITY

This application is a continuation of, and claims priority to, PCT Patent Application No. PCT/US2021/027373, entitled "AGREEMENT TO SERVICE POLICY TRANSLATION SYSTEM", filed Apr. 14, 2021, which claims priority to U.S. Provisional Patent Application No. 63/152,760, entitled "BUSINESS AGREEMENT TO SERVICE POLICY TRANSLATION SYSTEM", filed Feb. 23, 2021, and U.S. Provisional Patent Application No. 63/152,762, entitled "ADAPTIVE SERVICE LEVEL ACCOUNTING SYSTEM", filed Feb. 23, 2021, which applications are incorporated by reference herein in their entirety.

FIELD

The disclosure generally relates to the field of providing network services and in particular, to ensuring network services meet agreed-upon performance standards.

BACKGROUND

Many high precision networks operated by network service providers provide service level guarantees. A service level guarantee is a formal promise to provide a measurable quality of service, termed a "service level", of network communication across a provider network. Such service level guarantees are generally governed by a service level agreement (SLA) between a network service provider and a client. The SLA generally defines level(s) of one or more services that are to be provided by the network service provider's network to the client in terms of at least one service level objective (SLO). The service provider then provides service assurance in order to be able to deliver the service levels that were promised. Service assurance involves monitoring service levels provided by the service provider's network and validating such service levels to ensure that the services provided by the network are within an acceptable range as discussed in the SLA.

SLAs are defined in various forms of business documents. Presently, in order to perform network accounting to determine whether SLAs are being met, one must manually review a business document to determine the terms of the agreement, specific service level objectives and metrics, and then monitor the network based on customer flows. The language used in business document is generally not conducive for network engineers to implement network service, nor does such language generally lend itself to automated processing.

In some cases, a service provider may wish to generate records which may give indications of whether or not SLOs associated with an SLA have been violated. This allows the service provided to make changes to the network in order to comply with the agreed-upon SLA with customers.

SUMMARY

One general aspect includes a computer implemented method of generating network service accounting data. The computer implemented method of generating network service accounting data also includes accessing one or more documents specifying network services in electronic form. The data also includes determining one or more network services specified by the documents, one or more service level agreements (SLAs) for each service, and one or more service level objectives (SLOs) for each SLA. The data also includes determining one or more service level values (SLVs) for each SLO. The data also includes selecting a metric associated with each SLV to be measured to determine compliance with the one or more SLOs. The data also includes storing each of the SLVs, SLOs and metrics as reusable data objects. The data also includes upon receipt of a network flow, generating conditional directives for insertion in the flow from the reusable data objects. Other embodiments of this aspect include corresponding computer systems, apparatus, and computer programs recorded on one or more computer storage devices, each configured to perform the actions of the methods.

Implementations may include the computer implemented method including any of the foregoing methods where determining comprises recognizing one or more named entities in the one or more documents that interact with one or more network services; and identifying elements of an SLO, SLV and/or metric using the named entities recognized. Implementations may include the computer implemented method including any of the foregoing methods where the computer implemented method further includes generating and storing a template for a packet contract comprising instructions, conditional directives, and/or metadata to generate accounting data for a packet in an adaptive service level accounting system. Implementations may include the computer implemented method including any of the foregoing methods where the computer implemented method further includes selecting metrics and associating each metric with an SLV. Implementations may include the computer implemented method including any of the foregoing methods further including generating a service subscription for a customer and storing the service subscription as a reusable data object. Implementations may include the computer implemented method including any of the foregoing methods where the computer implemented method further includes triggering an admission gateway of an adaptive service level accounting system. Implementations may include the computer implemented method including any of the foregoing methods where the accessing comprises accessing a new document defining a new customer of a network service provider or clarifying terms in another document. Implementations may include the computer implemented method including any of the foregoing methods where an SLA specification, the SLOs, the SLVs, and the metrics, are created by translating a document using a constrained lexicon having a restricted vocabulary and specified grammar rules. Implementations may include the computer implemented method including any of the foregoing methods where the translating includes disambiguating between multiple possible meanings of a term used in an SLA, SLO, SLV, and/or metric. Implementations may include the computer implemented method including any of the foregoing methods where the determining is performed using a model-based lexicon which includes at least one information model and one or more data models derived from the information model. Implementations may include the computer implemented method including any of the foregoing methods where the determining is performed using a model-based lexicon further includes one or more domain ontologies. Implementations may include the computer implemented method including any of the foregoing methods where the determining is performed by applying formal logic to the model-based lexicon.

One general aspect includes a processing device. The processing device includes a non-transitory memory storage may include instructions. The device also includes one or more processors in communication with the memory, where the one or more processors execute the instructions upon receipt of a one or more network service agreements in electronic form to: determine one or more network services specified by the network service agreement, and one or more service level agreements for each service; determine one or more service level objectives for each service level agreement and one or more service level values for each service level objective; select a metric associated with each SLV to be measured to determine compliance with the one or more SLOs. The device also includes store each of the service level agreements, service level objectives, service level values and metrics as reusable data objects and upon receipt of a network flow, generate instructions for insertion in the flow from the reusable data objects. Other embodiments of this aspect include corresponding computer systems, apparatus, and computer programs recorded on one or more computer storage devices, each configured to perform the actions of the methods.

Implementations may include a processing device including any of the foregoing devices where the one or more processors execute instructions to determine one or more network services and to recognize one or more named entities in the one or more network service agreements that interact with one or more network services; and identifying elements of an SLO, SLV and/or metric. Implementations may include a processing device including any of the foregoing devices where the one or more processors execute instructions to further generate and store a template for a packet contract comprising instructions, conditional directives, and/or metadata to generate accounting data for a packet in an adaptive service level accounting system. Implementations may include a processing device including any of the foregoing devices where the one or more processors execute instructions to further construct metrics and associate each metric generated with an SLV. Implementations may include a processing device including any of the foregoing devices where the one or more processors execute instructions to generate a service subscription for a customer and storing the service subscription as a reusable data object. Implementations may include a processing device including any of the foregoing devices where the one or more processors execute instructions to trigger an admission gateway function of an adaptive service level accounting system. Implementations may include a processing device including any of the foregoing devices where the one or more processors execute instructions to access a new network service agreement defining a new customer of a network service provider or clarifying terms in another network service agreement. Implementations may include a processing device including any of the foregoing devices where the one or more processors execute instructions to translate a network service agreement using a constrained lexicon having a restricted vocabulary and specified grammar rules to identify and/or construct SLAs, SLOs, SLVs, and metrics. Implementations may include a processing device including any of the foregoing devices where the one or more processors execute instructions to disambiguate between multiple possible meanings of a term used in an SLA, SLO, SLV, and/or metric. Implementations may include a processing device including any of the foregoing devices where the one or more processors execute instructions to use a model-based lexicon which includes at least one information model and one or more data models derived from the information model. Implementations may include a processing device including any of the foregoing devices where the model-based lexicon further includes one or more domain ontologies. Implementations may include a processing device including any of the foregoing devices where the one or more processors execute instructions to determine the one or more network services by applying formal logic to the model-based lexicon.

One general aspect includes a non-transitory, computer-readable medium storing computer instructions to generate processing objects translated from network service agreements. The non-transitory computer-readable medium storing computer instructions also includes accessing one or more network service agreements in electronic form. The instructions also include determining one or more network services specified by the network service agreement, and one or more service level agreements (SLAs) for each service. The instructions also include determining one or more service level objectives (SLOs) for each service level agreement and one or more service level values (SLVs) for each service level objective. The instructions also include selecting a metric associated with each SLV to be measured to determine compliance with the one or more SLAs. The instructions also include storing each of the service level agreements, service level objectives, service level values and metrics as reusable data objects. The instructions also include upon receipt of a network flow, generating instructions for insertion in the flow from the reusable data objects. Other embodiments of this aspect include corresponding computer systems, apparatus, and computer programs recorded on one or more computer storage devices, each configured to perform the actions of the methods.

Implementations may include any one or more of the non-transitory computer-readable medium having the foregoing features and further having instructions where the determining comprises recognizing one or more named entities in the one or more network service agreements that interact with one or more network services; and identifying elements of an SLA, SLO, SLV and/or metric using the named entities recognized. Implementations may include any one or more of the non-transitory computer-readable medium having the foregoing features and further having instructions where the steps further include generating and storing a template for a packet contract comprising instructions, conditional directives, and/or metadata to generate accounting data for a packet in an adaptive service level accounting system. Implementations may include any one or more of the non-transitory computer-readable medium having the foregoing features where the steps further include identifying one or more key values for metrics associated with each SLV for measuring conformance with the service level agreement. Implementations may include any one or more of the non-transitory computer-readable medium having the foregoing features where the steps further include selecting metrics and associating each metric with an SLV. Implementations may include any one or more of the non-transitory computer-readable medium having the foregoing features and further having instructions where the steps further include generating a service subscription for a customer and storing the service subscription as a reusable data object. Implementations may include any one or more of the non-transitory computer-readable medium having the foregoing features and further having instructions where the instructions cause the processor to trigger an admission gateway function of an adaptive service level accounting system. Implementations may include any one or more of the non-transitory computer-readable medium having the foregoing features and further having instructions where the accessing comprises accessing a new network service agreement defining a new customer of a network service provider or clarifying terms in another network service agreement. Implementations may include any one or more of the non-transitory computer-readable medium having the foregoing features and further having instructions where an SLA specification, the SLOs, the SLVs, and the metrics, are created by translating a network service agreement using a constrained lexicon having a restricted vocabulary and specified grammar rules. Implementations may include any one or more of the non-transitory computer-readable medium having the foregoing features and further having instructions where the translating includes disambiguating between multiple possible meanings of a term used in an SLA, SLO, SLV, and/or metric. Implementations may include any one or more of the non-transitory computer-readable medium having the foregoing features and further having instructions where the determining is performed using a model-based lexicon which includes at least one information model and one or more data models derived from the information model. Implementations may include any one or more of the non-transitory computer-readable medium having the foregoing features and further having instructions where the determining is performed using a model-based lexicon further includes one or more domain ontologies. Implementations may include any one or more of the non-transitory computer-readable medium having the foregoing features and further having instructions where the determining is performed by applying formal logic to the model-based lexicon.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate the same or similar elements.

FIG. 5A illustrates a basic example of a template.

FIG. 5B illustrate a packet contract generated from the template of FIG. 5A.

FIG. 6 is an illustration of a packet contract of FIG. 5B in a Big Packet Protocol packet.

FIG. 7A is a method in accordance with one embodiment of the present disclosure.

FIG. 7B is one embodiment of a method for generating SLAs and SLOs at step 725 of FIG. 7A.

DETAILED DESCRIPTION

Figure 1:
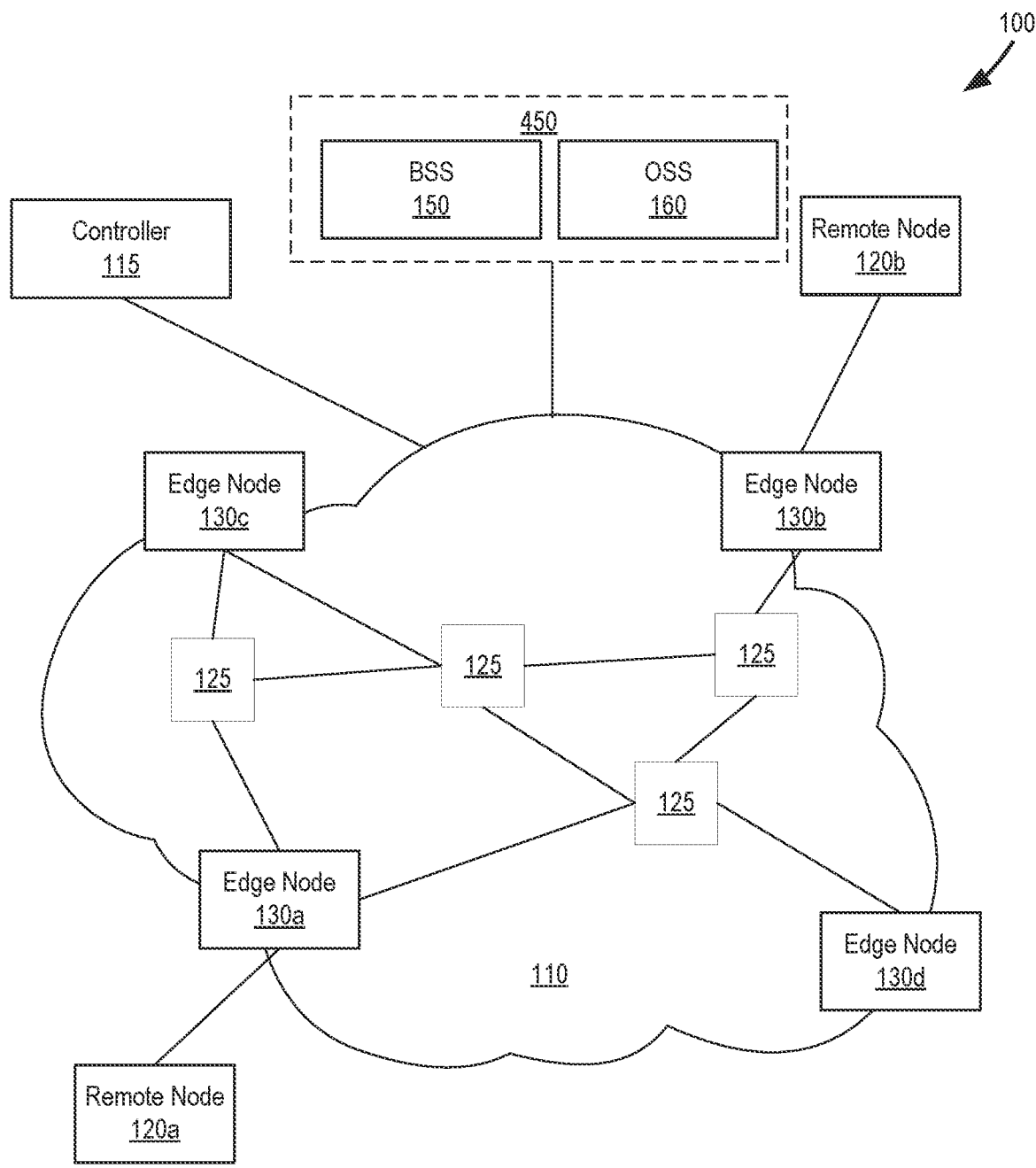
FIG. 1 is an overview block diagram depicting a network environment suitable for implementing the described technology.

The present disclosure and embodiments address providing service assurances to allow a network service provider to comply with SLAs agreed to with customers. Embodiments described herein include an adaptive service level accounting system and an agreement-to-service policy translation system.

Embodiments described herein include a system that automatically determines actions to be taken by a network to generate accounting data which can be carried in the flow and which enables measurement of SLOs associated with SLAs. This allows a network service provider to determine, for each data flow, whether the SLA associated with each data flow for a customer is being met. The system inserts one or more conditional directives into a packet in a format that is described herein as a "contract" (or a "packet contract") into one or more packets in a data flow. Each packet contract can include instructions (or conditional directives) that nodes that process the packet shall perform to generate accounting data to be stored within the packet. A packet contract comprises a portion of a packet in a data flow and includes conditional directives (or "instructions") and metadata, the conditional directives causing nodes in a network to execute directives based on a defined condition. It should be understood that the packet contract can be in a different section of the packet than the data payload but the location of the packet contract in the packet may vary. The conditional directive may cause the node to read, write, update, delete, or otherwise modify metadata for the data flow in the packet, for example. Thus, the metadata can be an input and/or an output for the conditional directive. packet contracts described herein can be generated by accessing a library of templates associated with one or more SLAs, and instantiating a template to create a packet contract which specifies what accounting data will be needed, along with instructions that will generate the accounting data at one or more network nodes. The accounting data can then be carried within the packet to an egress node (or other processing device) which can use the accounting data to determine whether the SLA is being met and take action or alert a network service provider. The system performs such insertion of packet contracts programmatically at one or more nodes, and adapts to changes in customers, the service provided to each customer and different service levels, by allowing bindings between various service level agreements and packet contract templates.

In one embodiment, generation of packet contracts for injection into a network flow occurs at an ingress node of the network. The packet contracts enable the service level, i.e. the quality of the service to be measured, to compare the observed service levels against service level objectives as specified in the SLA and to thus determine whether any SLO violations have occurred. The processing of accounting data by nodes in the network differ based on the SLA and the SLOs associated with an SLA. A library of templates is maintained, with each template providing a blueprint of actions to be taken for a specific type of SLA. These blueprints can be parametrized, for example, with parameters for specific values of an SLO, and algorithmically instantiated into the actual packet contracts to be inserted into the packet. The generation of the specific actions to take is triggered by a customer and SLA lookup that determines the initiator of a flow (e.g., by looking up the source address, a flow identifier, or by other means), then looks up the SLA that governs this particular user, from which the corresponding template can be identified and instantiated per the SLOs that are a part of the SLA.

For example, given one has an "in-time" service that guarantees that the latency of packets in a flow will not exceed 60 milliseconds (msec), one might want to generate an accounting record that shows how many packets were delivered within msec, as well as how many packets were delivered late (or that were dropped altogether). A packet contract indicates: the need to measure end-to-end latency for this packet (and the specific steps required at each node traversed in order to enable that); and once at the egress node, instructions to compare the latency against the SLO (in this case: 60 msec) and update one of two flow counters (maintained at the egress node) to indicate whether it was within the 60 msec, or whether it was late.

Embodiments of the disclosed technology further comprise an agreement translation system which allows a network service provider to provide service assurances to comply with each SLA agreed to with customers. The disclosed technology provides a system which allows network service providers to programmatically analyze agreements, determine SLAs and SLOs in the agreements as well as measurable metrics for the SLOs, and translate the SLAs, SLOs, and metrics to a form that can be used to determine whether the network service provider is meeting the SLA.

The translation system accesses one or more agreements and parses the one or more agreements into a processing format. The system then determines which network services are specified by the agreements, and service level agreements for each service. An SLA may be defined in multiple documents or agreements, multiple SLAs could apply to different aspects of the same service and one can have different documents defining SLOs for a given SLA. These documents generally comprise network service agreements which can be understood as defining the SLAs between customers and providers. The translation system then generates one or more SLOs for each SLA and one or more service level values (SLVs) for each SLO. One or more metrics are then selected to be associated with each SLV to be measured to determine compliance with the service level objective. The system then stores each or any of the service level agreements, service level objectives, service level values and metrics as reusable objects.

An SLA generally defines service level guarantees provided by a service provider to a client in terms of SLOs, which specify that a service needs to be provided at a certain level of quality. A SLO refers to a target for a service level, such as availability, throughput, response time, delay, and/or jitter (e.g., a delay of less than msec, a throughput better than one hundred fifty packets per second, etc.) For example, an SLO may specify a target (e.g., objective) that should be met to provide a service level. The target/objective may be defined in terms of one or more measurable properties, which may be referred to as metrics or key performance indicators (KPIs). A KPI may include one or more measurable network service metrics such as latency, throughput, bandwidth, dropped packets, errors, jitter, out-of-order delivery, etc. The SLO may specify a threshold that should not be breached and/or an acceptable range. The SLO can also specify statistical objectives for flows, such as a specified percentage of packets should meet a corresponding target/threshold.

An SLA specification can thus be created as a reusable data object having the format SLA: {SLO, {SLV, metric}*}*} (where "*" indicates one or more instances. Each SLA specification may thus include one or more SLOs, each SLO having one or more SLVs, and each SLV having one or more metrics. Each service provided by a provider may be provided to multiple clients, and each client may have one or more services. SLA specifications can also be provided with other formats.

In one embodiment, the technology will be described with respect to an adaptive service level accounting system which allows a network service provider to insert service level accounting data (tracking metrics of data flows) into network flows in order to produce accounting records for billing and settlement. An important by-product of this process is to determine whether there are service issues. This allows a network service provider to determine, for each data flow, whether the set of SLOs associated with each data flow for a customer is being met. The service level accounting system inserts one or more packet contracts into one or more packets in a data flow, with each packet contract specifying instructions (or conditional directives) that nodes that process the packet must perform to generate accounting data to be stored with the packet. Thus, a packet contract can specify what accounting data will be needed, along with instructions that will generate the accounting data at one or more network nodes. The accounting data can then be carried within the packet to an egress node (or other processing device) which can use the accounting data to determine whether the set of SLOs is being met and act or alert a network service provider. The adaptive service level accounting system performs such insertion of packet contracts programmatically at one or more nodes, and adapts to changes in customers, the service provided to each customer and different service levels, by allowing bindings between various services (as specified in one or more SLAs) and packet contract templates.

Embodiments of the technology can be used by customers and/or network service providers to translate documents into an SLA specification, along with its constituent SLOs, and constraints that define the behavior of services. Embodiments of the technology can be used by customers and/or network service providers to translate each SLO into a set of service level values (SLVs), where each SLV is associated with an accounting and compliance metric. Embodiments of the technology can be used by customers and/or network service providers to translate applicable restrictions to SLA specifications and/or SLOs on a context-specific basis. The use of formal logic enables embodiments of the technology to prove that a new term in a document has a particular meaning and can aid the semantic analysis function in recognizing conflicting agreement definitions, indirect references between terms, as well as mis-spellings and other linguistic errors. Another use of the technology is to allow a Service Provider to test that a service to be offered can meet its associated SLOs by building the documents and then feeding them to the system to gather test results. However, it should be understood that the translation technology disclosed herein may be used for other purposes. For example, the translation technology can be used to analyze other aspects of documents for other purposes such as creating a database of agreement terms for use in subsequently prepared agreements.

The network service provider should provide service assurance to ensure that the service levels that were promised are indeed kept, and that any violations of service level objectives are detected so that mitigating actions can be taken. In some examples, this includes taking preventive actions, in which case the service provider may focus also on detecting negative trends in service levels. The service accounting data allows a service provider to comply with service assurance.

Service assurance may be provided for in the SLA. While many mechanisms can be employed for service assurance, an example service assurance system may measure service levels according to KPIs and export measurement results to external systems and/or network controllers for analysis and comparison against the SLO boundaries/thresholds. The external system/controller may determine whether the traffic meets the SLOs. Accordingly, such systems verify the test traffic meet the SLO and presume that the test traffic is also representative of the data traffic across the network.

Similarly, service assurance may be provided through generation and injection of network packet contact that indicates to nodes that a current packet should be given a level of priority (or another preferred treatment) such that the SLOs can be met. For example, the packet may receive a packet contract containing a directive indicating that the packet should receive the increased priority (and thus leading to improved performance) in addition to the previously described packet contracts for measurement and reporting of performance.

In accordance with certain embodiments, the system described herein may be implemented with Internet Protocol, or with one or more advanced frameworks for Internet Protocol, generally referred to as New IP which inherently enables variable-length and multi-semantic network addresses, conditional directives, and user-defined networking. For example, Big Packet Protocol (BPP) is a network communication protocol used for implementing self-driving packets and packet-programmable statelets. A self-driving packet is a data packet that contains a block or set of fields that define a set of conditional directives used to guide processing of the packet by a forwarding device (e.g., a network node such as a router). It should be noted that a conditional directive may be treated by a network as an unconditional command by setting a condition that always evaluates to true (or otherwise stating that the directive should always be performed). Each packet may include a combination of packet fields (e.g., source, destination), a flow identifier (ID), and/or other special marking(s). A service level refers to the level of quality that is provided by a service according to some characteristic, for example a delay of twelve msec, a throughput of two hundred packets per second, etc.

Adaptive Service Level Accounting System

FIG. 1 is a diagram of an example network 100 in which an adaptive service level network accounting system may be utilized. The adaptive service level network accounting system may be utilized with the translation system discussed herein, but should be understood to optionally also be utilized without the translation system, and may further be used to provide packet contacts in network packets which carry conditional directives used for other purposes. The network 100 may be operated by a service provider or other provider of networking services, such as enterprise network service providers, information technology departments, data center providers, etc. The network 100 includes a network domain 110 including edge nodes 130 (130a-130d) that act as ingress and egress points and internal nodes 125 that communicate data, such as a data flow of data packets therethrough. The network domain may allow remote nodes 120a, 120b to communicate. In some examples, the network domain 110 may optionally include a controller 115, such as a software defined network (SDN) controller, to manage network routing.

Remote nodes 120a-120b are nodes that operate applications and wish to communicate. In one example, remote nodes 120a, 120b are nodes of a customer of a network service provider. For example, remote nodes 120a-120b may include servers, clients, and/or other computers with a network interface. Such remote nodes 120a-120b may communicate by transmitting data flows via the network domain 110. A data flow can be recognized and transmitted by nodes 125, 130 between, for example, remote nodes 120a and 120b. For example, a data flow may be initiated by a sender at a remote node 120a, which enters the network at edge (ingress) node 130a and traverses one, two, or more internal nodes 125 to reach edge (egress) node 130b and is thereafter forwarded to remote node 120b. Data in a data flow is separated into data packets for transmission. The data packets in the flow include a number of fields that include both the data passed between the source and destination nodes and allow nodes 125, 130 to direct the flow within the network. A data packet generally includes a header with routing information, and a payload with the data exchanged between the remote nodes 120a, 120b.

The network domain 110 may be operated by a network service provider and may comprise interconnected network components controlled by a common set of networking policies. The edge nodes 130 are network devices capable of converting data packets into a form that complies with the policies of the network domain 110. For example, the edge nodes 130 may implement security policies for the network domain 110, change data packet network addresses according to network domain 110 addressing schemes, manage pathing through the network domain 110 for the data flow, etc.

The edge nodes 130 are interconnected by a series of internal nodes 125 and corresponding links, depicted as lines. The internal nodes 125 are network devices, such as routers, that are configured to read data packet header information and forward the data packets according to the header information. In some cases, network domain 110 routing functions and data management functions may be disaggregated and spread amongst various edge nodes 130 and/or internal nodes 112 throughout the network domain 110. In other cases, the network domain 110 may include a controller 115, which is a network device configured to make routing decisions and manage network 100 operations.

The network domain 110 may employ instructions comprising conditional directives for routing the data packets and, in the case of the present embodiment, updating accounting data in a packet. The conditional directives allow the packets to direct how the packets should be routed (e.g., self-driving) instead of relying on network policies at the internal nodes 112 and/or edge nodes 130. A conditional directive may be placed in the packet contract that is inserted into the packet by the edge node 130 acting as an ingress node (e.g., the head-end node). The conditional directive includes a condition, a command, and may also include one or more parameters. The condition indicates an item that must be satisfied before the command is executed. When the condition is not met, the command is ignored. The command indicates an action or actions to be taken by the node processing the data packet upon occurrence of the condition. The parameters (for example, as metadata), when present, can further clarify the condition, the command, or both, and can also carry other information.

Also shown in FIG. 1 is a business support system (BSS) 150 and an operations support system (OSS) 160 coupled to the network domain 110. Generally, a BSS performs product management, customer management, revenue management and order management. The OSS generally performs network management, service delivery, service fulfillment, service assurance and customer care. In the context of this disclosure, the OSS performs data lookup and generation functions to generate packet contracts which themselves generate accounting data, although in other embodiments, the functions described by the BSS/OSS may be provided by a separate controller or embedded in one or more edge nodes 130. The BSS is concerned with documents and accounting; the OSS gathers metrics, and programs packet flows and configuration in general. In the context of this description, elements of the described technology may be present in the BSS or OSS and hence will be described in the context of a combined BSS/OSS 450.

Data flows entering the network may be received from one or more flow originators or "clients" (network connected devices), with each customer of the network provider optionally having multiple originators which transmit packets in the network. Association of flows with originators and thus customers may be determined based on the port, on the source address of the packet, or on other metadata that is a part of the packet.

Figure 2:
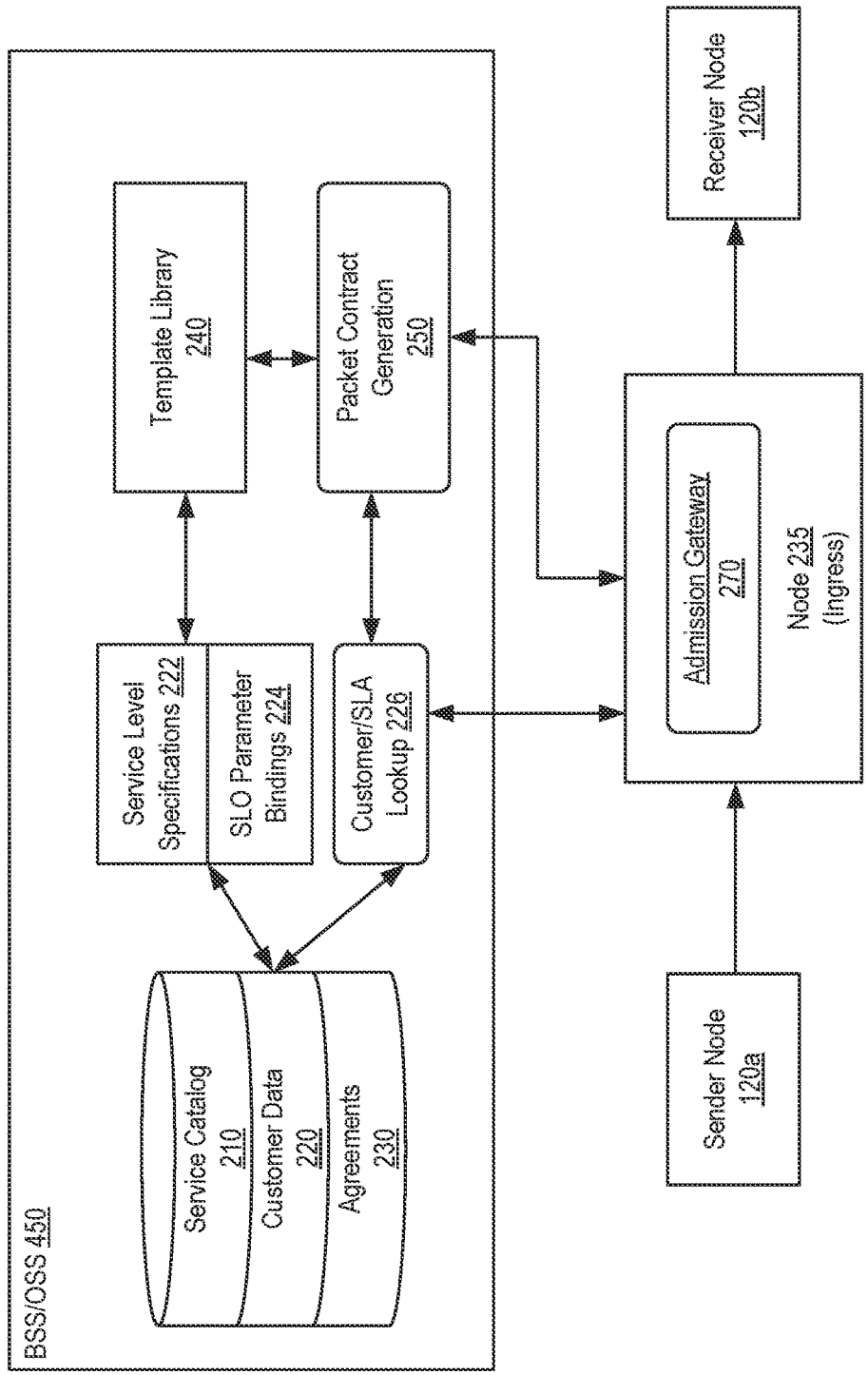
FIG. 2 is a block diagram illustrating components of the adaptive accounting system incorporated into a BSS/OSS and a network node.

FIG. 2 illustrates components of the adaptive accounting system incorporated into a BSS/OSS 450 and a network node 235. The present technology enables a system that provides accounting data to each packet in a network flow to enable the network to automatically generate SLO-aware accounting data for network flows according to the terms specified in an SLA and/or agreement. Specifically, the system can be used to generate packet contracts (or other conditional directives) whenever the service is provided using a protocol that supports said packet contracts. As illustrated in FIG. 2, the system uses a library of templates 240 that are associated with different SLAs in an SLA database 222. Each template (an example of which is shown in FIG. 5A) specifies a blueprint for the packet contract that is to be injected into packets of flows that are governed by the SLA, in order to generate the accounting data that will be required per the SLA. In one embodiment, the network node 235 is an edge node and in a further embodiment, the network node 235 is an ingress node. As discussed herein, while each of the nodes illustrated in FIG. 1 may update accounting data in a packet contract, network node 235 as the ingress node admits flows into the network domain and executes instructions described herein to generate and install packet contracts in the flow.

In addition to the template library 240, the BSS/OSS 450 may include a service catalog database 210, a customer data database 220, and an agreements database 230. The service catalog database 210 contains various service offerings from a network service provider. For example, a network service provider may offer any number of services in the form of products having differing service classes, where each service class may be differentiated using different characteristics and behavior. The service catalog 210 specifies, for each product/service, the offered characteristics and expected behavior.

The agreements database 230 includes one or more agreements reflecting the service offerings contained in the service catalog 210. The agreements database allows for bindings between a set of SLO parameter values that can be used to instantiate a template. Bindings for particular customers and particular SLAs are stored in the customer data database 220. As detailed below, the SLOs for each SLA for a given customer are stored in the bindings which allow packet contracts to be populated with SLO parameters being tracked in the packet flow through the network.

The customer database 220 stores associations between customers and the products the customer has purchased, and the network service provider has agreed to provide. In one embodiment, the customer data database 220 will contain associated service level agreements 222 and SLO parameter bindings 224 associated with those SLAs for each customer. A SLA for which service-level aware accounting records are to be generated has an association with a template, so the corresponding packet contracts can be generated. A template can be bound to many SLAs (which might differ, for example, in their SLO parameter values). The role of the binding is to determine which packet contract(s) goes with which SLA (or set of SLOs). The packet contract is generated from the template and, if applicable, parameters from the SLOs.

The BSS/OSS 450 further includes a customer/SLA lookup engine 226 and a packet contract generation engine 250. These engines work in conjunction with an admission gateway engine 270 in node 235 to add a packet contract to packets in a data flow.

When a sender initiates a flow, the admission gateway engine 270 fetches the applicable packet contract from the packet contract generation engine 250 for insertion into the flow as it arrives at node 235. As detailed further in FIG. 3, the admission gateway engine 270 checks with a customer/SLA lookup engine 226 which identifies the SLA that governs that particular flow received at node 235. The admission gateway engine 270 then issues a request to a packet contract generation engine 250 to deliver the applicable packet contract for that SLA and flow, and injects the packet contract into packets of that flow as applicable.

Generating the packet contract by the packet contract generation engine involves determining which SLA (or SLA specification) applies to the sender using the lookup engine 226, retrieving the corresponding template from the template library 240, and instantiating the template to create a contract. While SLA specifications and client information may be maintained in a BSS and template libraries may be maintained in an OSS, in other embodiments, one or more of such specifications and client information may be cached to allow determination of the client and packet contract to be inserted to be performed at each node, or proxied by a controller or a specialized function at the network edge.

The template library 240 allows the packet contract generation engine 250 to associate each SLA with a corresponding template for a packet contract containing a set of one or more accounting directives (i.e., directives that specify how and what type of accounting data to generate), along with a set of optional parameters that can be used to customize the accounting directive. In other words, the template provides a blueprint for the packet contract collateral that needs to be included in the packets in order to generate SLO-aware accounting data as required for a given SLA.

In the above "in-time" service example, template library 240 might contain a template for the "in-time" service SLA that has one parameter, called "max-latency". The entry contains as an accounting directive a New IP packet contract that specifies how to measure end-to-end latency and the instruction to increment a statelet parameter when two conditions are met: (1) the latency exceeds a parameter "max-latency" (with a placeholder for max-latency), and (2) the node being an egress node. The statelet parameter can be stored by the node, stored in a current packet, or stored on another device in the network. Another entry in the template library might contain a template for an SLA with no parameters and might instead include an indicator for predefined SLOs for max-latency, min-latency, and loss. The corresponding packet contract might be pre-instantiated, and contain directives to maintain three distinct records, distinguishing between violations of min-latency, max-latency, and violated milliseconds.

In one embodiment of the adaptive service level accounting system, the templates in the template library are generated manually. In another embodiment, described herein, the templates are generated programmatically by parsing agreements, and determining SLA specifications and SLOs in accordance with the disclosed embodiments, using an Agreement to Service Policy translation system.

The packet contract generation engine 250 instantiates a packet contract from a template and a set of parameter (i.e. SLO) values. The SLA specification defines which template(s) to apply and any SLO parameter values. The admission gateway function 270 fetches packet contracts as needed (dependent on the customer and initiated services) and injects them into packets.

The set of bindings between SLAs and templates is provided, where each binding contains a set of SLO parameter values that can be used to instantiate the template. This in turn selects the template. Once this is done, the template may be instantiated by the packet contract generation engine 250. Any SLA for which service-level aware accounting records are to be generated has an association with a template so the corresponding packet contracts can be generated. A template can be bound to many SLAs (which might differ, for example, in their SLO parameter values). The role of the binding is to be able to determine which packet contract goes with which SLA (or set of SLOs). The packet contract is generated from the template and, if applicable, parameters from the SLOs.

For example, again using the "in-time" example, a template may provide a generic packet contract that allows generation of accounting records for an in-time service that has an SLO for end-to-end latency. The template may not specify the actual value of the SLO (e.g., whether it is 50 msec, or 60 msec, or 100 msec), but rather merely define a packet contract that allows the system to generate accounting records for an in-time service. The actual value (i.e. 60 msec) to use is obtained from the particular SLO (in effect for that particular service instance for that particular customer) which is contained in the binding for the SLA associated with the customer. The binding thus contains specific parameters (defined in the SLA for a customer) associated with the SLOs for a customer. In this example, the binding defines the specified SLO values which require tracking in the system accounting. Then, the template of the packet contract is instantiated as a packet contract that specifies the actual SLO parameter as 60 msec.

Once the data flow reaches an egress node, service level objective accounting data can be extracted.

Figure 3:
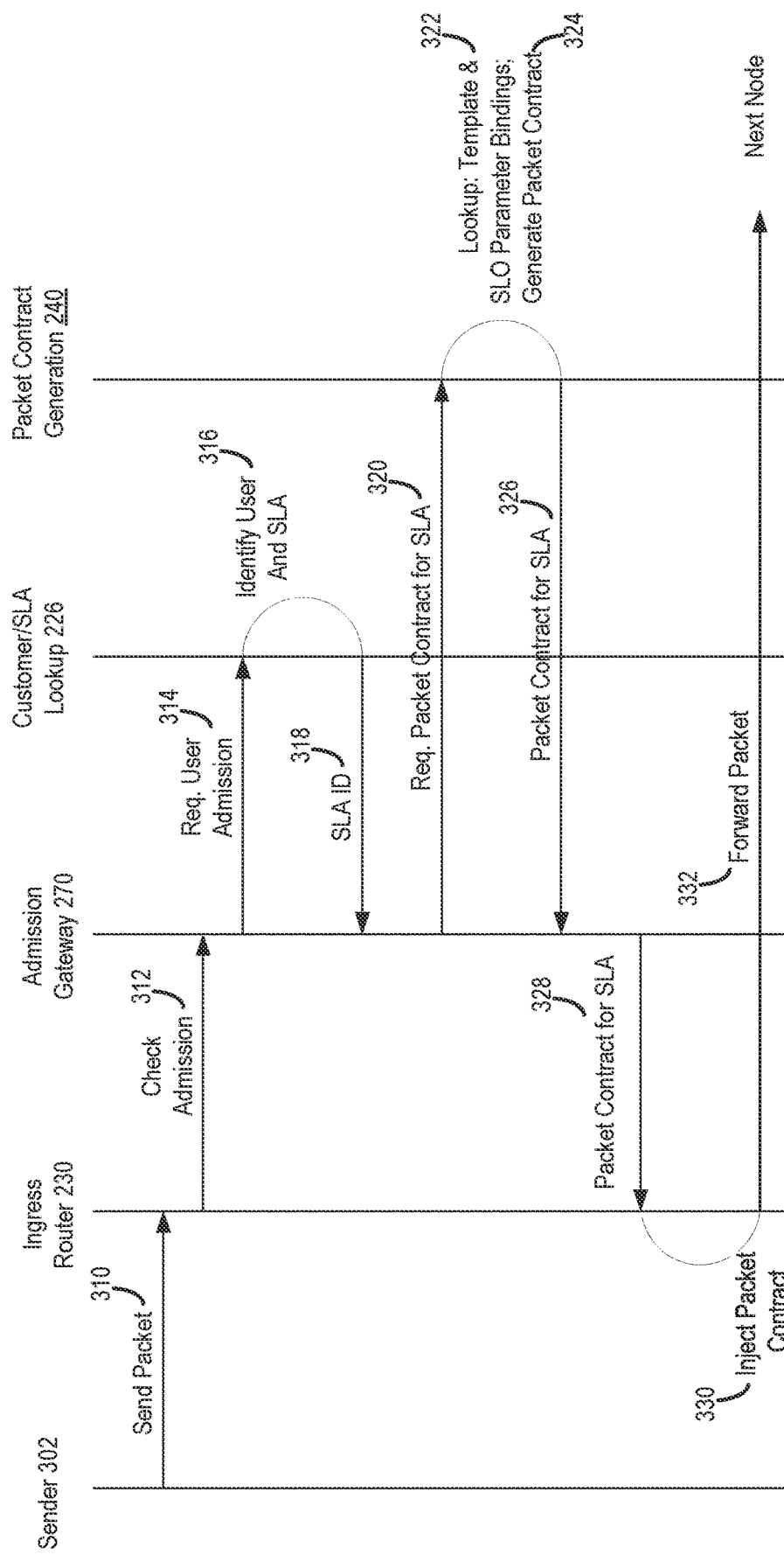
FIG. 3 illustrates a method in accordance with the present technology.

FIG. 3 illustrates a method in accordance with the present technology. Initially, a sender 302 will forward a packet 310 as part of a data flow to a destination. In one embodiment, the sender may be a remote node (such as node 120a) and the destination may likewise be a remote node (such as node 120b), with the data flow passing through a network domain 110 such as that illustrated in FIG. 1. At node 235 (illustrated in FIG. 2, and which may comprise node 130a of FIG. 1), the node may check with the admission gateway engine to determine if the user is allowed to forward traffic on the network at 312. This determination may be made by reference to the source IP of the packet or other identifying data contained in the packet. At 314, the admission gateway requests user admission from the customer/SLA lookup engine 226. Customer SLA lookup engine 226 will identify the user and/or the SLA associated with the user at 316. The customer/SLA lookup engine 226 can then return an SLA identifier at 318 to the admission gateway 270. The admission gateway 270 can then request a packet contract be generated at 320 from the packet generation engine 240. The packet contract generation engine 240 will then look up the template and SLO parameter bindings at 322 and generate a packet contract 324. The packet contract generation engine 240 will then return the packet contract for the SLA at 326 to the admission gateway 270. The admission gateway engine 270 will then communicate the packet contract for the user/SLA at 328 to the ingress router 230 which will then inject the packet contract at 330 into the packet in the data flow. At 332, the ingress router 230 will then forward the packet to the next node which may be another node in the network domain 110 or the destination node.

Figure 4:
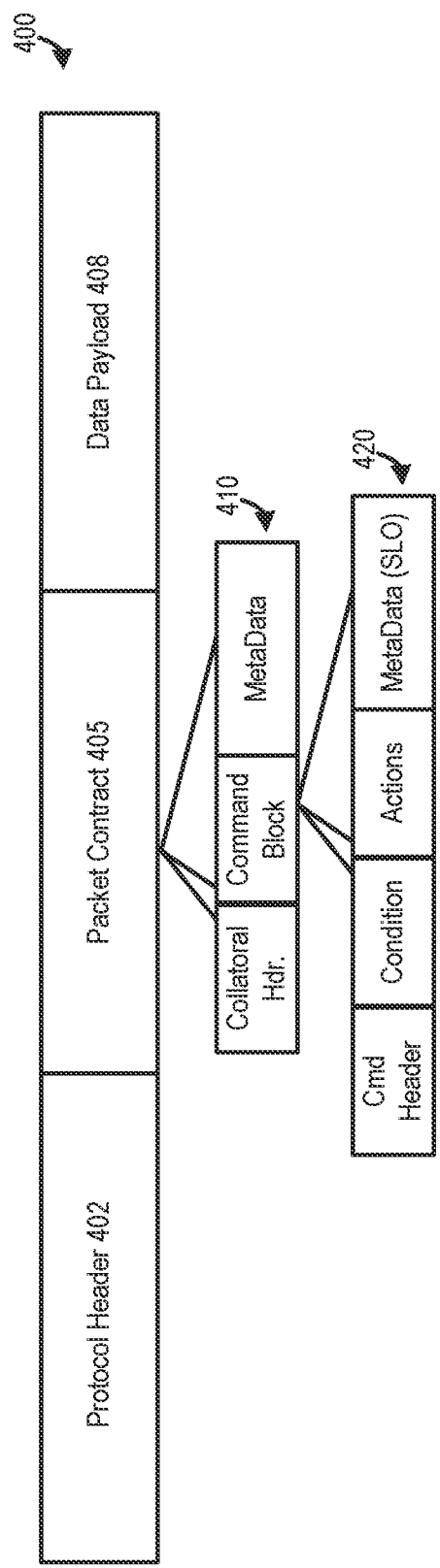
FIG. 4 depicts a simplified view of data packet containing a packet contract.

FIG. 4 depicts a simplified view of data packet 400 containing a packet contract. In one embodiment, conditional directives are used to implement a packet contract as discussed herein. However, other forms of conditional directives within a packet, such as within a header of a packet, can also be used. The conditional commands can instruct network nodes to generate the accounting data specified by the packet contract based on one or more SLOs for a given SLA. In a conditional directive, if the condition(s) for the conditional command(s) are met, the internal node processing the packet can execute the associated command(s).

As illustrated in FIG. 4, a data packet 400 will include a protocol header 402, a packet contract 405, and a data payload 408. The packet contract 405, when implemented as a BPP packet, may include a collateral header, command block and metadata at 410. The command block includes a command header, a condition, actions (directives) associated with the conditions, and metadata which can optionally be in the form of SLOs or accounting data to enable tracking of the SLOs. Additional details of the template and packet contract are illustrated in FIG. 5B and FIG. 6. Conditional directives can also be implemented in other portions of a packet, and/or with other protocols.

A BPP packed may implement conditional commands by including a command block and/or metadata in addition to other header information. Upon entering the network domain 110, the edge node 130/230 may execute the conditional commands to add metadata such as the SLO to the data packet. The packets may also be updated by the internal nodes 125. Regardless of the approach used, the conditional commands can direct the nodes 130/125 to add SLO-related information to the packets. The conditional commands can also be employed using Boolean expressions including and/or/not logic. For example, multiple counters can track varying levels of packet characteristics. As a particular example, a packet with a characteristic that exceeds a first threshold, but not a second threshold, can increment a first counter. Further, a packet with a characteristic that exceeds both boundaries can increment a second counter.

FIG. 5A illustrates an exemplary template 500 used to generate a packet contract. The template is illustrated in pseudocode and illustrated in the context of a BPP template, though as noted herein, many different templates and protocols may be utilized within the subject matter of this system. It should be understood that FIG. presents a relatively simple template example, and each template may take many different forms and different syntaxes may be implemented to create a template. In the example shown in FIG. 5A, the template 500 is for a service requiring packets to be delivered in a specified time period, (e.g. the "in-time" example referenced herein) defined by an SLO that the packet have an end-to-end latency not to exceed "n" msec. Although numerous types of data may be utilized to track this SLO, in this example, two counters are used to generate a count of "compliant packets" and "violated packets" (relative to the "in-time" SLO). In this template 500, packet timings are recorded by two counters, specified in the packet by different offsets within the packet metadata. For example, rather than checking a specified latency by counters, where the network is time synchronized, the packet could carry an actual latency calculation derived from a carried time and computed delay at each node.

In FIG. 5A, the template 500 indicates the conditional commands and parameters from the SLO which are used to create a packet contract. In the template 500, the metadata which is needed for the packet contract to measure packet latency is specified as a latency "lat" and the service level objective "slo" for the latency. The maximum latency parameter for the SLO ($$n) is provided from the SLA for the customer and the parameter bindings database 224. Note that the data offsets are not specified but are generated for each packet contract. In this example, three commands (CMD 1, CMD 2 and CMD 3) are provided in the template 500 and, as discussed below, specify metadata (in this case two counters) by offset and length. As discussed above, each command may have an associated condition. In FIG. 5A, CMD 1 is an instruction to update the latency parameter "lat" unconditionally, followed by a conditional command (CMD 2/CMD 3) where, on egress, (at CMD2) if the latency is greater than the specified SLO parameter, a counter statelet (par.stlt) at offset 0 is incremented, and if not, (CMD3) then a different counter at offset 4 is incremented. The counter data can be stored (with or without the packet) for retrieval at the egress node or thereafter for analysis.

FIG. 5B illustrates a packet contract 600 in pseudocode generated from the template of FIG. 5A. The commands in template 500 are inserted into the packet contract 600. CMD1 defines the update latency action 620 with no condition. CMD 2 is inserted at 630 with two conditions at 635: to perform the command on egress of the packet and to perform the text for whether the SLO is greater than the latency. The action for CMD 2 comprises incrementing a first counter if the condition is true (at 640) and ending the command string ("break") at 645. If the condition 635 is false, then on egress 655, the next action 660 is to increment a second counter. As illustrated at 600, the metadata is referred to in each command by offset rather than name.

FIG. 6 illustrates the packet contract in a BPP packet binary form. With reference to FIG. 5B, each command in the packet contract 600 includes a command header, action and optionally, a condition. Reference numbers in FIG. 6 correspond to the pseudocode illustrated in FIG. 5B. As such, a first command 610 is provided to update latency 620 with no condition; a second command 630 includes a header, the egress and greater-than tests 635, the increment action 640 and (conditional) break 645; the third command is conditioned on egress 655 and the failure of the greater-than test at 635. Metadata fields 670 and 680 are also illustrated.

Agreement to Service Policy Translation System

As noted above, the templates in the template library may be generated programmatically by an agreement to service policy translation system.

The disclosed technology provides a system which allows network service providers to programmatically analyze documents, determine SLA specifications and SLOs in the document as well as measurable metrics for the SLOs, and translate the SLAs, SLOs, and metrics to a form that can be used to determine whether the network service provider is meeting the service level agreement.

As noted above, the translation system accesses one or more documents and parses the one or more documents into a processing format. The system then determines which network services are specified by the document, and service level agreements for each service. An SLA may be defined in multiple documents, multiple SLAs could apply to different aspects of the same service and one can have different documents defining SLOs for a given SLA. These documents generally comprise network service agreements which can be understood as defining the SLAs between customers and providers. The translation system then generates one or more service level objectives for each service level agreement and one or more service level values for each service level objective. The service level objectives can be combined in an SLA specification, as discussed above. One or more metrics are then selected to be associated with each service level value to be measured to determine compliance with the service level objective. The system then stores each of the service level agreement specifications, service level objectives, service level values and metrics as reusable objects.

FIG. 7A is a method illustrating an overview of the disclosed technology. The technology automatically processes agreements (and other documents) using natural language processing. The vocabulary used by the natural language processing is provided by a lexicon that restricts the vocabulary to a set of terms and phrases to provide an understanding of accounting for network services, including compliance and accounting metrics for a customer, service or product. Normally, parsing natural language is a very difficult and computationally intensive task. The technology disclosed herein aids in the automation of identifying and understanding the SLA and SLO information in any system in which such information is used. The technology also ensures that all information from the agreement is captured.

Currently, there is no standard that defines the structure and terminology of documents; each network service provider is free to create their own. Hence, at 710, a service provider or providers enter into one or more agreements with customers. Actual agreements between service providers and customers are used to create a constrained language model by processing a set of exemplary documents from a given network service provider at 715. The constrained language model so developed can then be used to process documents between network service providers and customers. The constrained language model limits the vocabulary and grammar available for use in agreements to a smaller set of terms and rules, suitable for use in documents, to recognize and extract accounting information. This constrained language is used in the model-based lexicon described below to determine meanings and data from each agreement under analysis by the system. This solves one issue with documents consumed by the present system: not all SLA specifications, SLOs, SLVs and metrics are stated in an easy-to-understand manner for network engineers, and as a result, programming of the network to produce the accounting records is difficult.

At 720, this system receives agreements executed by network service providers (or their agents, etc.) and their customers. At 725, the method generates, for each customer and each service used by the customer or for each service and each customer using the service, each SLA specification and its associated SLOs which may then be used by the service accounting system of FIG. 2. Each SLA specification may have multiple SLOs, and each SLO may have multiple SLVs and metrics. The SLA specifications and SLOs, and associated performance metrics for each SLO, can be used to specify templates for the system shown in FIG. 2. Step 725 may be performed by a document translation system described herein.

FIG. 7B illustrates one method for performing step 725 of FIG. 7A. At step 755, analysis of a document is triggered. Step 755 may be triggered when a document is submitted for analysis and parsing, which may occur in a number of ways. In one embodiment, triggering may occur by an adaptive service level accounting system when the admission gateway 270 authenticates a customer as a customer flow is received and determines the requested service. In this embodiment, the gateway 270 can then invoke the translation system to find documents related to the customer to be parsed. In another embodiment, either a customer or the network service provider may directly invoke the translation system and send the documents to this translation system. In another embodiment, metadata could be added to the types of documents that the customer or network service provider want to be parsed. The addition of a document with this metadata could trigger an event-based mechanism that in turn triggers the use of this translation system.

At step 760, the document is parsed to determine each service identified in the document, and one or more SLA specifications are generated for each service. This is performed by a semantic compiler 930 that uses a model-based lexicon 830, as described below. This information is stored as a set of reusable processing objects, which enables rapid identification of similar documents through, for example, pattern matching or semantic similarity, as well as the ability to create more complex SLAs through composition.

At step 765, a set of one or more SLOs are generated for each SLA. The SLO information is stored as a set of reusable processing objects which are associated with one or more SLAs. At step 770, a set of one or more SLVs are generated for each SLO. The SLV information is stored as one or more reusable processing objects and/or may added to the SLO object information.

At 775, a metric is selected and associated with each SLV. The metric information is stored as a set of reusable processing objects and/or added to the SLO object information.

At 780, the parsed document, along with other artifacts (such as context, business goals, and metadata) are used to modify any one or more of the above reusable objects (e.g., by adding restrictions or conditions).

At 785, a service subscription (consisting of the service of a customer, along with a set of SLA specifications, SLOs, SLVs, and metrics for that service) is generated for each service of each customer and stored as a reusable object. The service subscription can be used to trigger the admission gateway function of adaptive service level accounting system to let it know that a new user or SLA has been defined.

Figure 8:
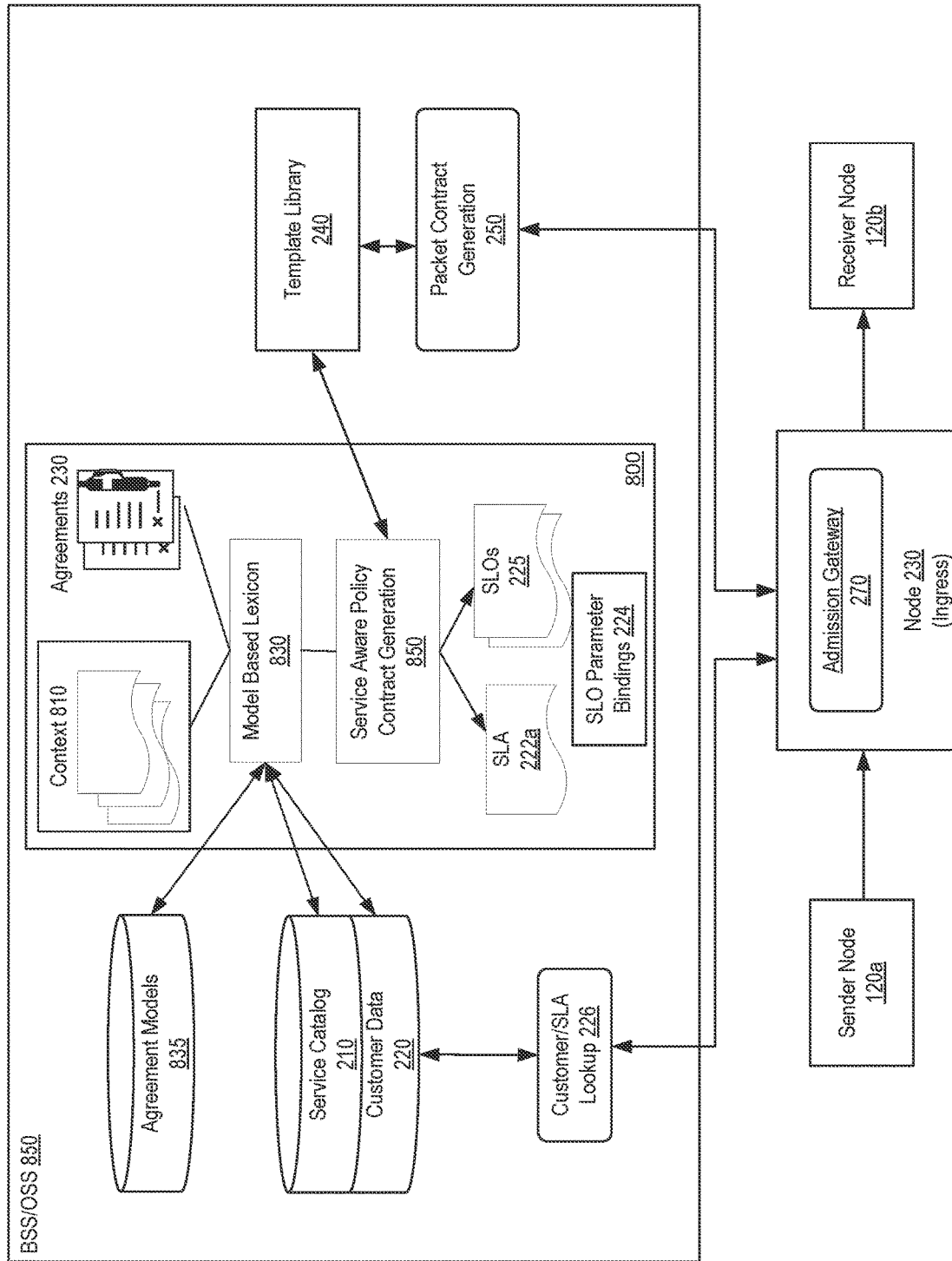
FIG. 8 is a block diagram illustrating components of an adaptive accounting system incorporated into a BSS/OSS and a network node.

FIG. 8 illustrates components of a document translation system 800 suitable for use in an adaptive service level accounting system which may be incorporated into a BSS/OSS 850. In FIG. 8 the translation system 800 is illustrated as present in the BSS/OSS 850, but it should be understood that the system 800 may be a stand-alone system, and/or other components shown in FIG. 8 can reside in either the BSS or OSS. In FIG. 8, like reference numbers indicate the same or similar elements to those shown in FIG. 2. In this embodiment, while the translation system is shown in the context of the adaptive service level accounting system, the translation system has broader applications.

FIG. 8 illustrates a translation system 800 including a model-based lexicon 830 and a service-aware policy packet contract generator 850. The model-based lexicon 830 includes an information model, data model and ontologies (used by a semantic compiler engine to generate the SLAs and SLOs from the agreements). The translation system 800 takes, as input, the agreements (or documents) 230 entered into by a network service provider, which may be limited by the context 810 of the constrained language model (which includes a formal grammar model) and generates the SLA specifications 222a and SLOs 225 culled from the agreements. The agreements 230 are stored in electronic form in computer-readable text which may be parsed programmatically by a processor executing instructions to perform the functions described herein. The SLA specifications, SLOs, SLVs and metrics derived from the documents are associated with one or more services and/or customers, and can be used by a service aware policy packet contract generator to create and update a library of templates 240 for use by the adaptive service level accounting system. A datastore of agreement models 835 can be utilized by and added to based on the model based lexicon.

Figure 9:
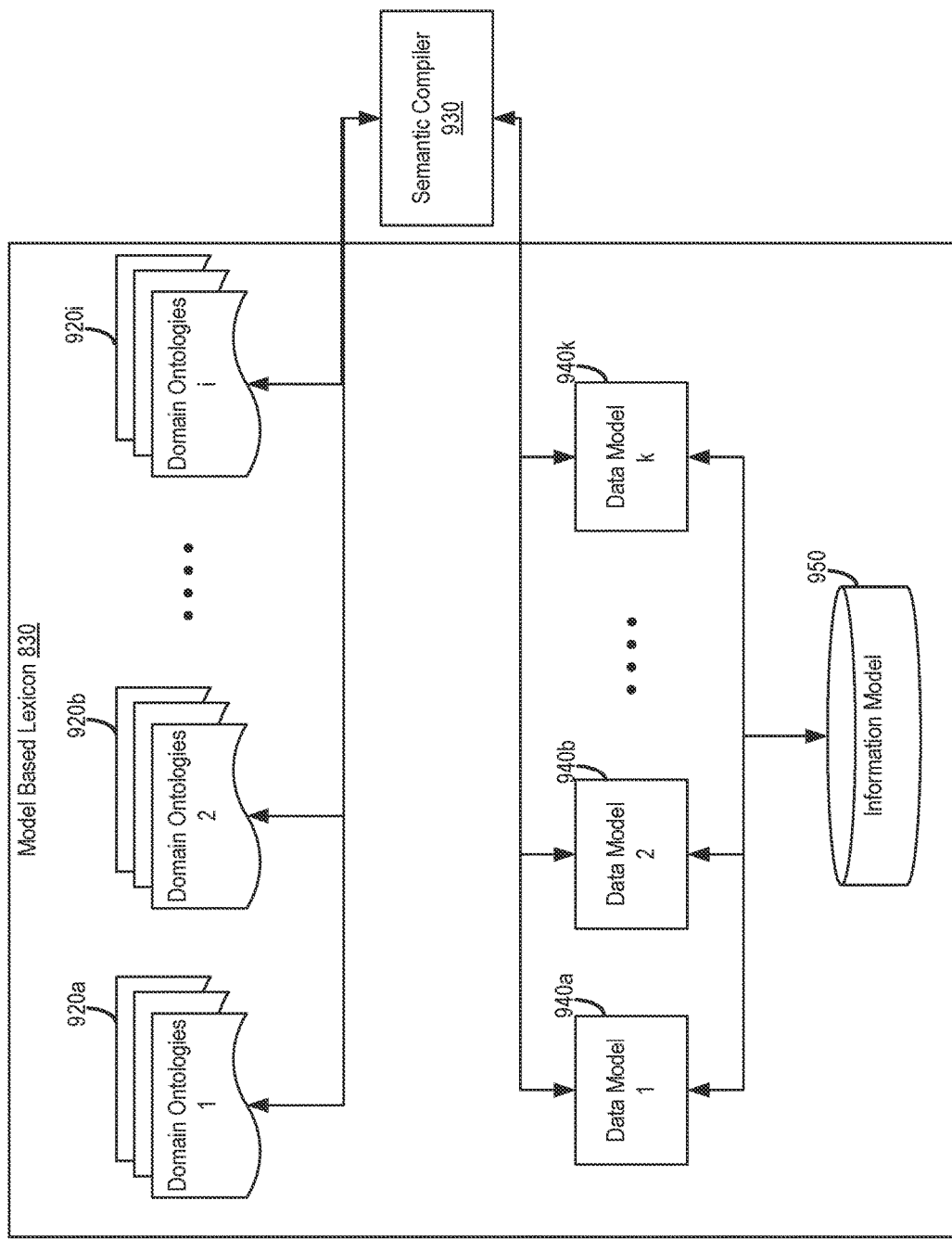
FIG. 9 is a block diagram of a model-based lexicon in accordance with embodiments of the present disclosure.

FIG. 9 illustrates aspects of the model-based lexicon. The model-based lexicon 830 is constructed of an information model 950, a set of data models 940a-940k, and a set of ontologies 920a-920i (wherein "k" and "i" represent any number of data models and ontologies). An information model is a representation of concepts of interest to an environment in a form that is independent of data repository, data definition language, query language, implementation language, and protocol. In contrast, a data model is a representation of concepts of interest to an environment in a form that is dependent on data repository, data definition language, query language, implementation language, and/or protocol (typically, but not necessarily, all five). Conceptually, an information model defines a managed object, including its attributes, methods, relationships, and behavior, in a technology-neutral fashion. Data models derived from the information model implement the managed object in a technology-specific fashion. A real world system uses data models because each data model provides advantages in representing types of data structures (e.g., storage and query speed) for different applications.

All data models 940a-940k are derived from the single information model 950. The data models 940a-940k describe actual data sources accessible to the semantic compiler 930. The data models provide information to the semantic compiler process (executed by a processor executing instructions to perform the functions described herein for the semantic compiler) to allow the semantic compiler to perform the functions described herein for the translation system 800. Such data sources may include items such as the customer data 220, service catalog 210 and agreements 230, all of which may be stored in different data structures (such as files, directories, relational databases, and the like). In order for the semantic compiler 930 to access different data structures to understand and combine diverse but related information about managed objects and their relationships, the data models 940a-940k are derived from the information model 950. For example, consider a customer defined in a directory vs. that same customer in a relational database management system. The former may contain different information (e.g., room number, company phone) than the latter. There is a huge difference in the types of queries that can be made, since protocols such as Lightweight Director Access Protocol (LDAP—a protocol designed for accessing and maintaining distributed directory information services) is designed for simple textual-oriented queries, and Structured Query Language (SQL) is a database query language for accessing relational databases. The data structure(s) used to implement the customer are almost certainly different. Unless a common definition of a "customer" is provided these two implementations cannot be reconciled. The information model provides formalism to the description of the various data models without constraining how that description is mapped to an actual implementation in software.

An ontology is a language, consisting of a vocabulary and a set of primitives, that enable the semantic characteristics of a domain to be modelled. Each domain ontology 920a-920i encompasses a representation, formal naming and definition of the categories, properties and relations between the concepts, data and entities that substantiate a particular domain, in this case that of customers, SLAs, SLOs and agreements, as well as network technologies. The domain ontologies 920a-920i represent specific concepts which belong to these realms, so that use of a term such as "Gold" (from the above examples of different product offerings) can be properly interpreted as a product defining the characteristics and behavior of a service offering (and not the metal), and related to the different characteristics of that product.

The model-based lexicon 830 allows a semantic compiler 930 to parse documents, and identify SLAs, SLOs, SLVs, and associated metrics from those documents. The compiler can also associate the SLAs, SLOs, SLVs, and metrics with customers that are contracting for network services that those SLAs, SLOs, SLVs, and metrics apply to. The model-based lexicon in conjunction with the semantic compiler, can be considered a reasoning system, in which the data models 940a-940k define "facts", and the ontologies 920a-920i augment these facts with formal semantics that are defined using a logic system. This enables the facts to be related to other objects in the system and enables the system to reason about the facts using formal logic. For example, a customer may have different SLAs depending on context (e.g., working versus non-working hours, or the type of access protocol used). Formal logic can be used to determine, for each context, the applicable SLA. This type of information serves as constraints on the SLA(s) and its associated SLOs.

The semantic compiler 930 determines the meaning of recognized words and phrases using the data models 940a-940k and domain ontologies 920a-920i. The semantic compiler 930 references the combination of data models 940a-940k and ontologies 920a-920i to determine, for each item in the agreement, the meaning of words and phrases in the context in which they are used. The semantic compiler 930 uses the model-based lexicon 830 to parse each received agreement (e.g., an SLA or a rule) and automatically determine the customers, services, and the set of SLAs and SLOs that this set of agreements refers to. The semantic compiler 930 also performs named entity recognition and other semantic functions, as described below.

The semantic compiler 930 performs automated translation of agreement language to an intermediate form, such as a parse tree or other semantic structure, for further machine processing. The parse tree identifies both the parts of speech and larger phrases (e.g., a noun phrase is a noun plus zero or more dependents, such as determiners, attributive adjectives, and noun adjuncts, where the dependents provide specific semantics to add meaning).

Figures 10, 13:
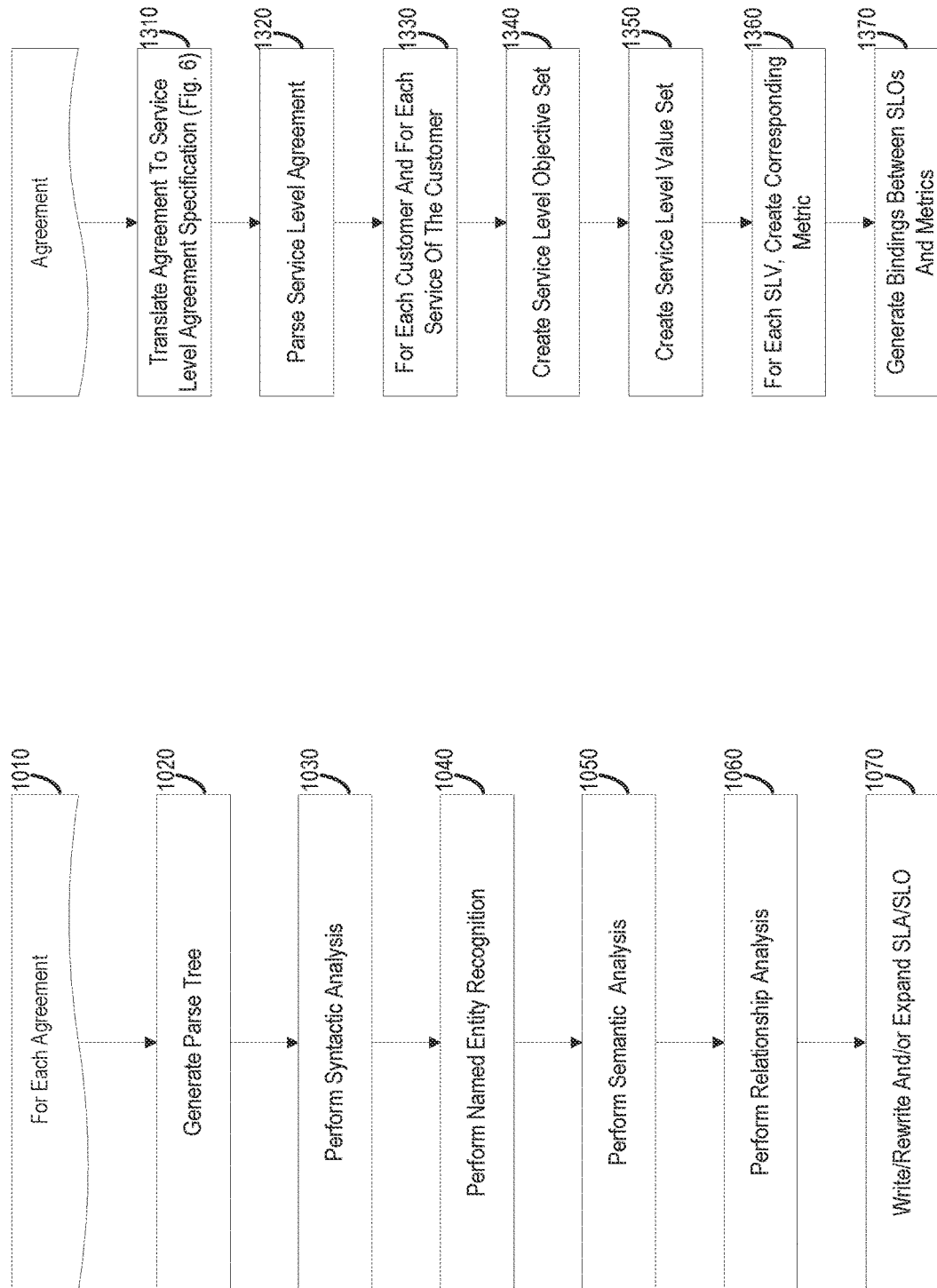
FIG. 10 is a method performed by the semantic compiler in accordance with embodiments of the disclosure.
FIG. 13 is a method performed by the semantic compiler in accordance with embodiments of the disclosure.

FIG. 10 illustrates a process performed by the semantic compiler to analyze a document. For each agreement, at 1010, a parse tree 1020 is created. For the purposes of this invention, a parse tree comprises an ordered, rooted tree that represents the syntactic structure of a string according to some context-free grammar (i.e., the constrained language model context 810). Thus, a parse tree of the agreement provides a structure based on the model-based lexicon for each agreement and individual terms in the agreement. A parser in the semantic compiler is used to take input data (text) and give structural representation of the input after checking for correct syntax as per the constrained formal grammar in the constrained language model context 810. It also builds a data structure in the form of a parse tree (or another format such as an abstract syntax tree or other hierarchical structure).

At 1030, syntactic analysis is performed. Syntactic analysis or syntax analysis ensures that each sentence in a document is structured correctly. Syntax analysis checks the text for meaningfulness comparing to the rules of formal grammar or in this case, the constrained grammar model. In this sense, syntactic analysis or parsing may be defined as the process of analyzing the strings of symbols in natural language conforming to the rules of formal grammar.

At 1040, named entity recognition is performed. Named entity recognition identifies and classifies key information (entities) in text according to pre-defined categories. An entity can be any word or series of words that consistently refers to the same thing. Every detected entity may be classified into a predetermined category, where categories can range from simple parts of speech (e.g., proper nouns) to important concepts that contain multiple items from the parse tree, such as an SLV, an SLO, or even an SLA. This information is used relative to the ontologies 920a-920i, where the relationships can be searched for similar meanings defined in the model-based lexicon 830. For example, the semantic compiler 930 might detect the word "ALPHA" in a text and classify it as a "customer".

At 1050, semantic analysis is performed. A semantic analyzer in the semantic compiler checks the text for meaningfulness by studying the meaning of first, individual elements and thereafter, combinations of elements of the parse tree to derive the proper meaning of the word phrase, or sentence. Semantic analysis is an inherently iterative process which verifies that the parse tree constructed follows all language rules.

At 1060, relationship analysis is performed. Relationship analysis comprises matching the entities determined from the document(s) with the elements of SLAs, SLOs and metrics (performance indicators). For example, an SLA may enable a given network service to be used at a set of specific points in one or more networks. Other documents may identify said points using a variety of terms, such as "gateway", "network access point", or the name or IP address of a device. Similarly, any of these terms may be constrained (e.g., the "Gold" network access point vs the "Silver" network access point). Relationship analysis uses the definitions of these named entities and their associated meaning to add semantic annotations that define this set of entities and their roles and functions.

At 1070, the SLA specification is generated (or re-written) based on the aforementioned steps. Each service will have at least one SLA specification. Each SLA specification will include at least one SLO, and each SLO has at least one SLV and associated metric. Each SLA specification may have multiple SLOs, and each SLO may have multiple SLVs and metrics.

In order to perform any one or more of the syntactic analysis 1030, named entity recognition 1040, semantic analysis 1050 and/or relationship analysis 1060 steps discussed in FIG. 10, the semantic compiler forms a multigraph which can be used to search and construct relationships between entities, with each entity identified with a node in the graph. The multigraph construction and use of the model-based lexicon is described with respect to FIGS. 11A-11B and 12A-12B.

Figure 11A:
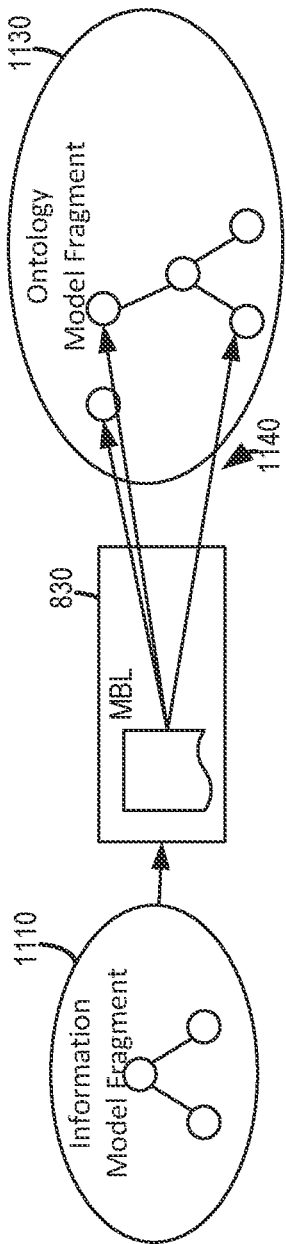
FIGS. 11A and 11B are illustrations of the relationship between the information data model and the ontologies of the model-based lexicon.
Figure 11B:
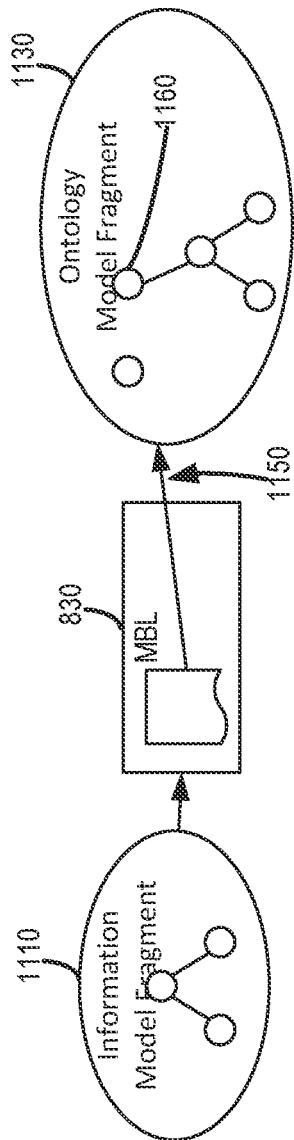

FIGS. 11A and 11B illustrate the process of using the ontologies 920a-920i and information model 950; this process is also applicable for each data model 920i-920k. In one aspect, the information model (or data model(s)), as well as the applicable ontologies, are each transformed into directed acyclic graphs which can be traversed by following known relationships between nodes of that graph (e.g., inheritance (expressed linguistically as hyponyms and hypernyms), whole-part (expressed linguistically as holonyms and meronyms), and other relationships), and further enables semantic relationships to be defined as pointers and relationships between nodes for the semantic compiler 930.

In FIG. 11A, an initial query against the model-based lexicon for an entity will be made using one or more portions 1110 of the information model 950. While only one fragment 1110 of the information model 950 is shown, it should be understood that an initial query may be referred to multiple elements (nodes) in the information model 950. FIG. 11A illustrates that the model-based lexicon 830 identifies multiple targets 1140 in a portion 1130 of a domain ontology which may be relevant to the search being conducted by the semantic compiler, although it should be understood that multiple targets may be identified in one or more domain ontologies. For example, a model can define the concept of a customer, which has a number of pre-defined relationships to SLAs, billing information, agreement term, longevity as a customer, etc.

Semantic relationships in the respective graphs are defined by building associations between different nodes and edges in each graph may represent, for example, different linguistic relationships, such as synonymy, antonymy, or semantic equivalence. In a processing environment, creating associations between nodes may involve creating pointers between respective data structures in the respective data sources represented by the data models.

In the example shown in FIGS. 11A and 11B, for each entity identified, a subset of information model nodes 1110 provide targets 1130 (in the data nodes and the ontologies) for possible semantic enhancement. These targets 1130 are identified by mapping concepts embedded in an information model node (or edge, or a set of nodes and edges) to concepts present in the model-based lexicon 1120. As noted above, the model-based lexicon provides a set of common concepts and terminology that all users and applications of the system have agreed on. Hence, it serves as a mechanism that relates information model objects to concepts in the ontologies.

The model-based lexicon is used to guide the selection of a subset 1150 of ontology nodes in FIG. 11B from each applicable ontology. Once a particular node 1160 is identified, the ontology is queried (1150) and the graph relative to that node traversed to determine whether the node and information in the node is of interest.

In general, an ontology could have a set of different meanings of a concept (e.g., "reset" could mean "reboot" or "change to the original value"). To resolve different meanings, formal logic is used in combination with the constrained grammar 810 and parse tree created at 1020 to resolve which meaning to use. In this context, formal logic may be considered as a set of inferences that can be drawn according to a set of defined rules. In general, formal logic allows one to determine an inference from purely formal content (in this case the entity or text). An inference possesses a purely formal and explicit content such as, a rule that is not about any particular thing or property.

Thus, a set of semantic relationships are defined that relate each unique concept in the set of ontology nodes to each unique concept in the set of information model nodes (or data model nodes). This is realized as a set of edges, which relate knowledge in the ontology to knowledge in the information model. This forms a multigraph, with semantic edges connecting elements in the information model to concepts in the ontologies. Each edge can be thought of as a pointer that augments the fact modelled in the information model with additional knowledge that exists in the set of ontology nodes that were identified by those edges. The augmentation is of a semantic nature and serves to clarify and specify the meaning of the concept(s) defined in the model by attaching appropriate definitions and/or linguistic relationships to those model concepts. The above-described examples of FIGS. 11A and 11B represent one embodiment of using the ontologies, information model and data models. In this embodiment, different pieces of customer information may reside in a directory (data model) and database (a different data model). While all of this information is defined in the information model, it may be represented using different datatypes and structures for efficiency in each data model. As such, the above example described building a multi-graph between the information models and the ontologies as one way of navigating the information given one has a complete set of semantic links. In an alternative, one could perform the same procedure using data models. While this is computationally more intensive, it relates the abstract information defined in the information model to actual data ingested by the system In yet another alternative, one can start with a lookup of items in the information model and as each relationship in the data model is found, a new process is started to semantically annotate the applicable term in the set of data models being used.

Figure 12A:
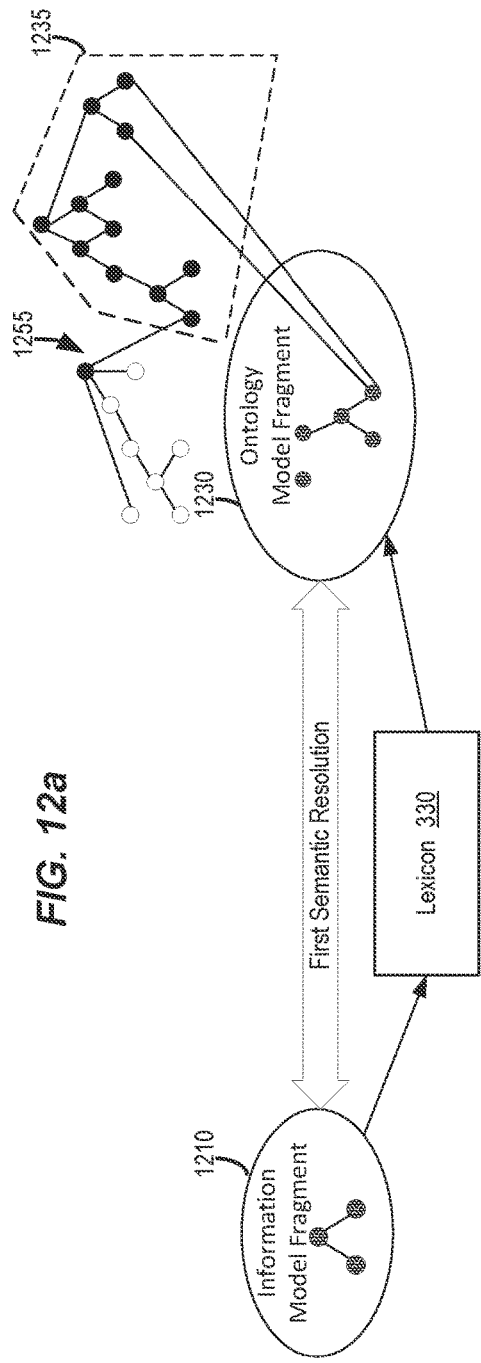
FIGS. 12A and 12B are illustrations of the relationship between the information data model and the ontologies of the model-based lexicon as the multigraph of the lexicon grows through multiple iterations.
Figure 12B:
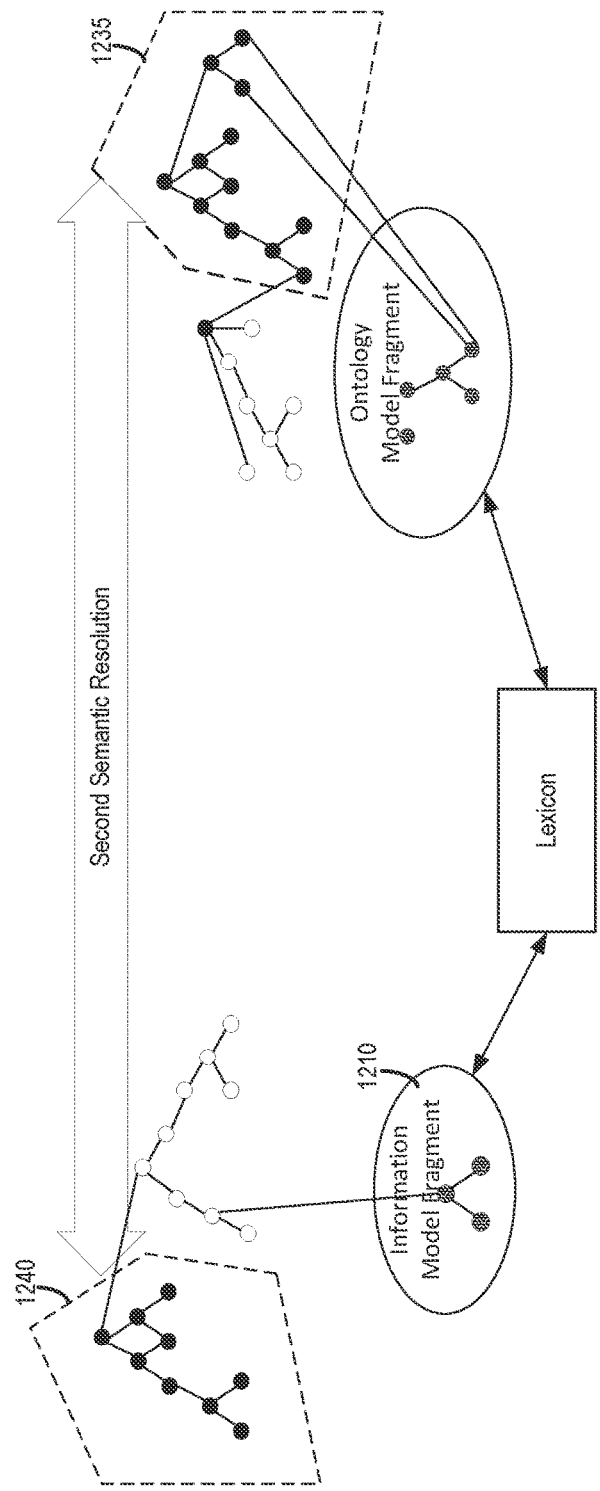

FIGS. 12A and 12B illustrate a multigraph and the recursive nature of the semantic compiler process when searching the ontologies 920a-920i. With reference to FIG. 12A, a first semantic resolution yields an initial set of ontology concepts (shown as group 1230) which are related to the information model nodes 1210. One or more nodes in fragment 1230 may then yield additional ontology concepts (1235) which can be related to both to the initial set of ontology concepts 1230 and to nodes 1240 in the information model 950. The semantic compiler 930 is used to guide the growth of both the ontological concepts and the information model nodes as shown in FIG. 12B at 1240.

An advantage of using the information model 950 is that if any information does not exist in the data model, then it can be written into the appropriate data model. The models and ontologies hence become a "template" that can be instantiated to identify managed objects at runtime.

The semantic compiler 930 may rewrite all or part of the input or its parse tree (e.g., by substituting equivalent terms into the parse tree) to discover additional concepts and relationships. Similarly, the model-based lexicon parses any contextual information that is important. For example, geographic location, time of day, type of connection, and other factors may be used to restrict the semantics of the SLA specification and its components (e.g., select a particular SLO and not use other related SLOs).

The output of the model-based lexicon is a multigraph containing semantic information that relates the principal Named Entities to each other. The process of searching the ontologies, information model and data models is performed for each document that is submitted.

FIG. 13 illustrates one use of the output of the method of FIG. 6. In one embodiment, the method of FIG. 13 is utilized by the service aware policy packet contract generation engine 850.

At 1310, an agreement may be translated to an SLA specification as discussed above at FIG. 10. Each SLA specification may be further parsed at 1320 into a parse tree (if needed) to allow the additional processing of FIG. 13. For each customer and for each service of the customer at 1330, a set of service level objectives is created at 1340, and a set of SLVs for each SLO is created at step 1350. Then, for each SLV, a corresponding metric to measure each service level object is created at 1360. Bindings may then be generated between the SLOs, the SLA specifications and the metrics at 1370. These bindings may be utilized to generate templates for an adaptive service level accounting system such as that described herein.

Figure 14:
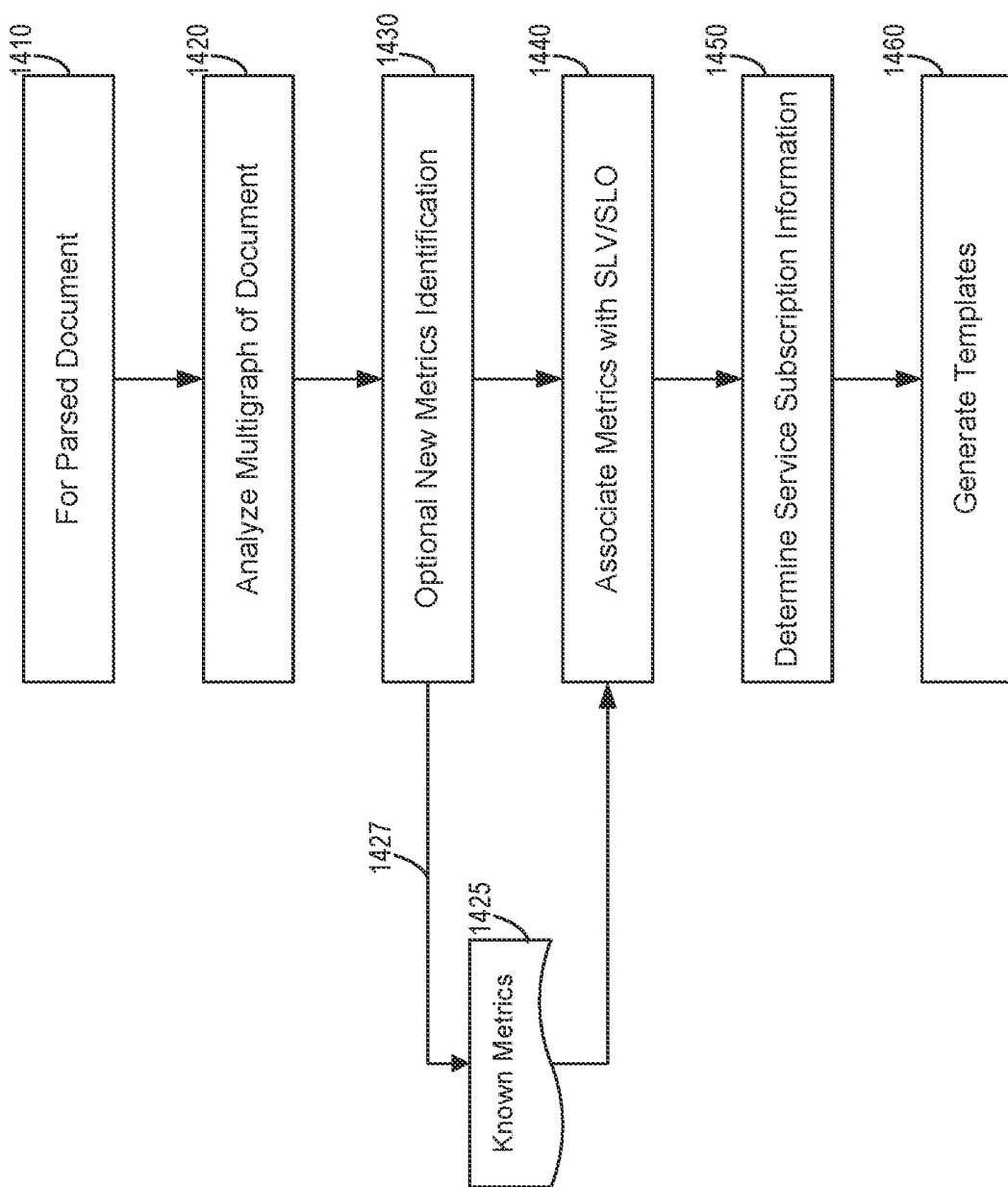
FIG. 14 is a method which may be performed by a service aware policy packet contract generation function.

FIG. 14 illustrates a method performed by the service aware policy packet contract generation engine 850 when embodiments of the disclosed technology are utilized in an adaptive service level accounting system. For each parsed document at 1410, a set of multigraphs produced by the model-based lexicon are analyzed at 1420 by the service aware policy packet contract generation engine 850. The policy packet contract generation engine may optionally identify new metrics from the multigraph. If any new metrics are found, then at optional 1427, the operator is notified of these newly found metrics, and may add those newly found metrics to the Known Metrics database 1425. At 1440, the engine 850 uses the semantic information generated by the model-based lexicon to associate known performance metrics (including newly found metrics, if added at 1425) with each SLV of an SLO. This can include associating known metrics 1425 previously identified for SLOs. At 1450, the service/subscription information for the service or customer are determined, and templates for packet contracts are generated at 1460.

The service aware policy packet contract generation engine 850 could also define new metrics (and edit existing metrics) for the adaptive service level accounting system by examining the output of each multigraph for words that the model-based lexicon has flagged that may be new metrics. This aspect of the disclosed technology utilizes formal logic. For example, if an unknown word is encountered in the parsed text, then a hypothesis can be formed as to the meaning of the word. The use of ontologies to select the best meaning for the newly identified word from among a set of alternative meanings increases the accuracy and efficiency of this approach. Formal logic defines a set of premises that must be true for this meaning to exist and seeks to logically prove the hypothesis. Any new metrics identified can optionally be verified by the service network provider before they are added and used.

The service aware policy packet contract generation engine 850 takes the resulting SLA specification (with its SLOs and SLVs), the metrics, and other important functions (e.g., contextual restrictions), transforms them to reusable objects, adds metadata for their disambiguation and for possible historical use, and adds them to a runtime model. The service aware policy packet contract generation engine 850 then generates a service subscription 1450, which may comprise an SLA specification object and its relationships. The service subscription object can be utilized for generating a template for the packet contract template library of the adaptive service level accounting system of FIG. 2. Optionally, it may send the customer and SLA specification, along with a notification of which template to use, to the admission gateway function of an adaptive service accounting system. This is useful in cases where a new customer or SLA has been added that the admission gateway is not aware of, and enables the adaptive service level accounting system to be triggered even when the system has no prior knowledge of a customer and/or the SLA(s) of a customer. This is especially useful for enabling a service provider to verify that a network service with a particular SLA can be supported by testing the network service through translating its SLA.

Figure 15A:
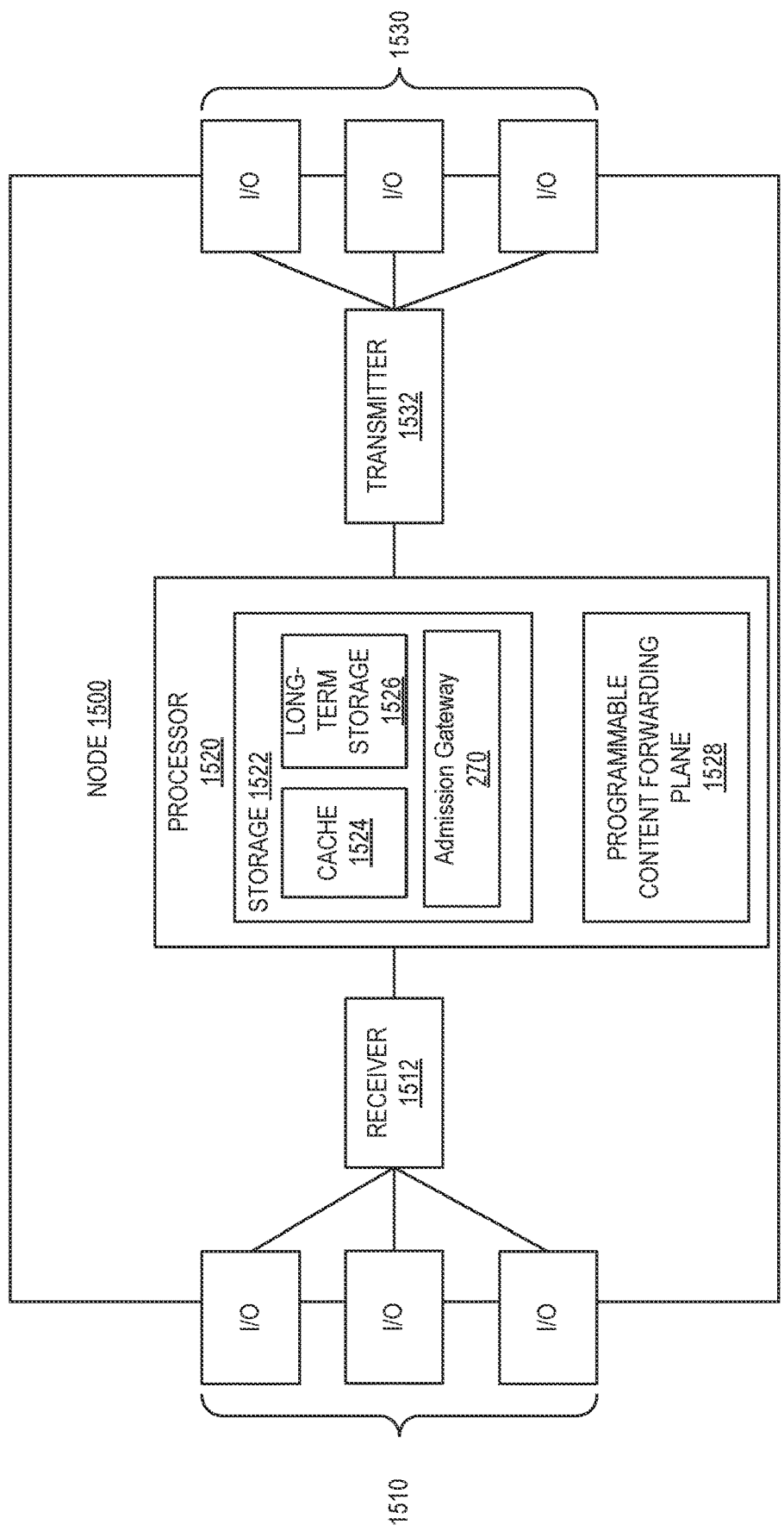
FIG. 15A is a block diagram of an example network node.

FIG. 15A is a schematic diagram illustrating exemplary details of a network device, or node, such as those shown in the network of FIG. 1. A node 1500 may comprise a router, switch, server or other network device, according to an embodiment. The node 1500 can correspond to one of the nodes 120, 125, 13 of FIG. 1. The router or other network node 1500 can be configured to implement or support embodiments of the present technology disclosed herein. The node 1500 may comprise a number of receiving input/output (I/O) ports 1510, a receiver 1512 for receiving packets, a number of transmitting I/O ports 1530 and a transmitter 1532 for forwarding packets. Although shown separated into an input section and an output section in FIG. 15, often these will be I/O ports 1510 and 1530 that are used for both down-stream and up-stream transfers and the receiver 1512 and transmitter 1532 will be transceivers. Together I/O ports 1510, receiver 1512, I/O ports 1530, and transmitter 1532 can be collectively referred to as a network interface that is configured to receive and transmit packets over a network.

The node 1500 can also include a processor 1520 that can be formed of one or more processing circuits and a memory or storage section 1522. The storage 1522 can be variously embodied based on available memory technologies and in this embodiment is shown to have a cache 1524, which could be formed from a volatile RAM memory such as SRAM or DRAM, and long-term storage 1526, which can be formed of non-volatile memory such as flash NAND memory or other memory technologies.

Storage 1522 can be used for storing both data and instructions for implementing the accounting data generating techniques described herein. In particular, instructions causing the processor 1520 to perform the functions of the admission gateway engine 270 may be included in the storage 1522.

Other elements on node 1500 can include the programmable content forwarding plane 1528 and the admission gateway 1550, described above. Depending on the embodiment, the programmable content forwarding plane 1528 can be part of the more general processing elements of the processor 1520 or a dedicated portion of the processing circuitry.

More specifically, the processor(s) 1520, including the programmable content forwarding plane 1528, can be configured to implement embodiments of the present technology described below. In accordance with certain embodiments, the memory 1522 stores computer readable instructions that are executed by the processor(s) 1520 to implement embodiments of the present technology. It would also be possible for embodiments of the present technology described below to be implemented, at least partially, using hardware logic components, such as, but not limited to, Field-programmable Gate Arrays (FPGAs), Application-specific Integrated Circuits (ASICs), Application-Specific Standard Products (ASSPs), System-on-a-chip systems (SOCs), Complex Programmable Logic Devices (CPLDs), special purpose computers, etc.

In the foregoing description, one embodiment allows for the packet contract to be cached at the ingress node to avoid the need for repeated lookups. Likewise, SLA and user information can be cached and maintained close to the edge of ingress nodes to facilitate packet contract injection.

Figure 15B:
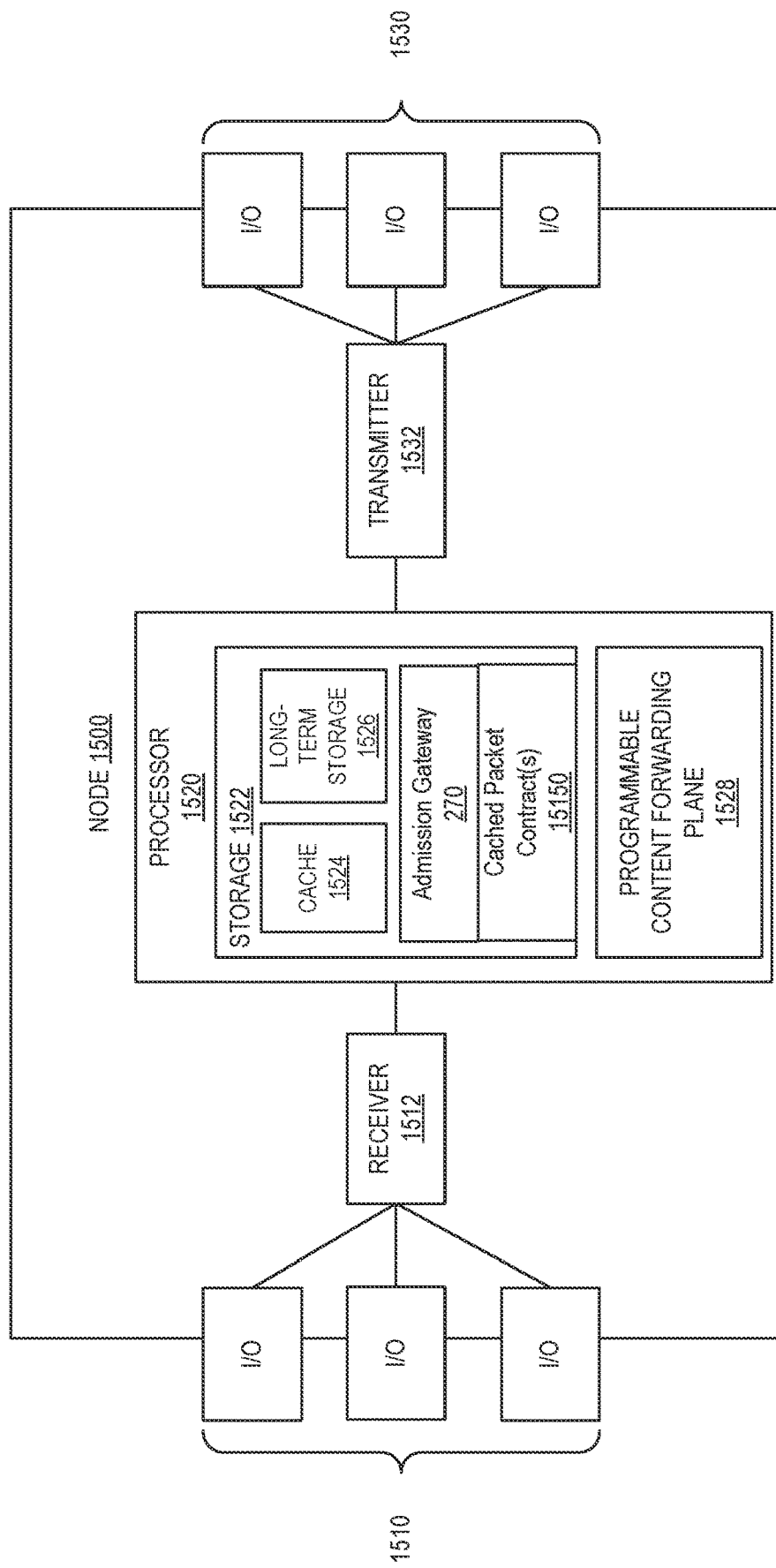
FIG. 15B is a block diagram of a second embodiment of a network node.

FIG. 15B illustrates this alternative. In FIG. 15B, like reference numbers represent identical elements to those in FIG. 15A. In FIG. 15B, cached packet contracts 1570 associated with one or more users, and/or for a flow or set of flows for each of the one or more users may be stored at the node 1500. The cached packet contracts 1570 may be used by the admission gateway engine for insertion into data packets without the gateway engine needed to query the BSS/OSS components to retrieve the packet contract for the flow. Still further, other instructions or commands can be applied to the admission gateway engine 270; the insertion of a packet contract would be one of several possible commands. For example, one command would be to inject the packet contract returned by the admission gateway engine into packets. Another command might involve for example, applying special markings to packets (to facilitate some other ways of accounting analytics for packets of a flow governed by a particular SLA). In that case, the template could include other commands, and the packet contract generation function becomes a more general packet handling instruction function. In another extension, a set of packet contracts (instead of a single one) might be generated and applied. In a still further embodiment, one may also cache the SLA itself, saving a step of looking up the SLA to determine bound templates, and saving any regeneration of additional packet contracts based on the stored SLA.

Figure 16:
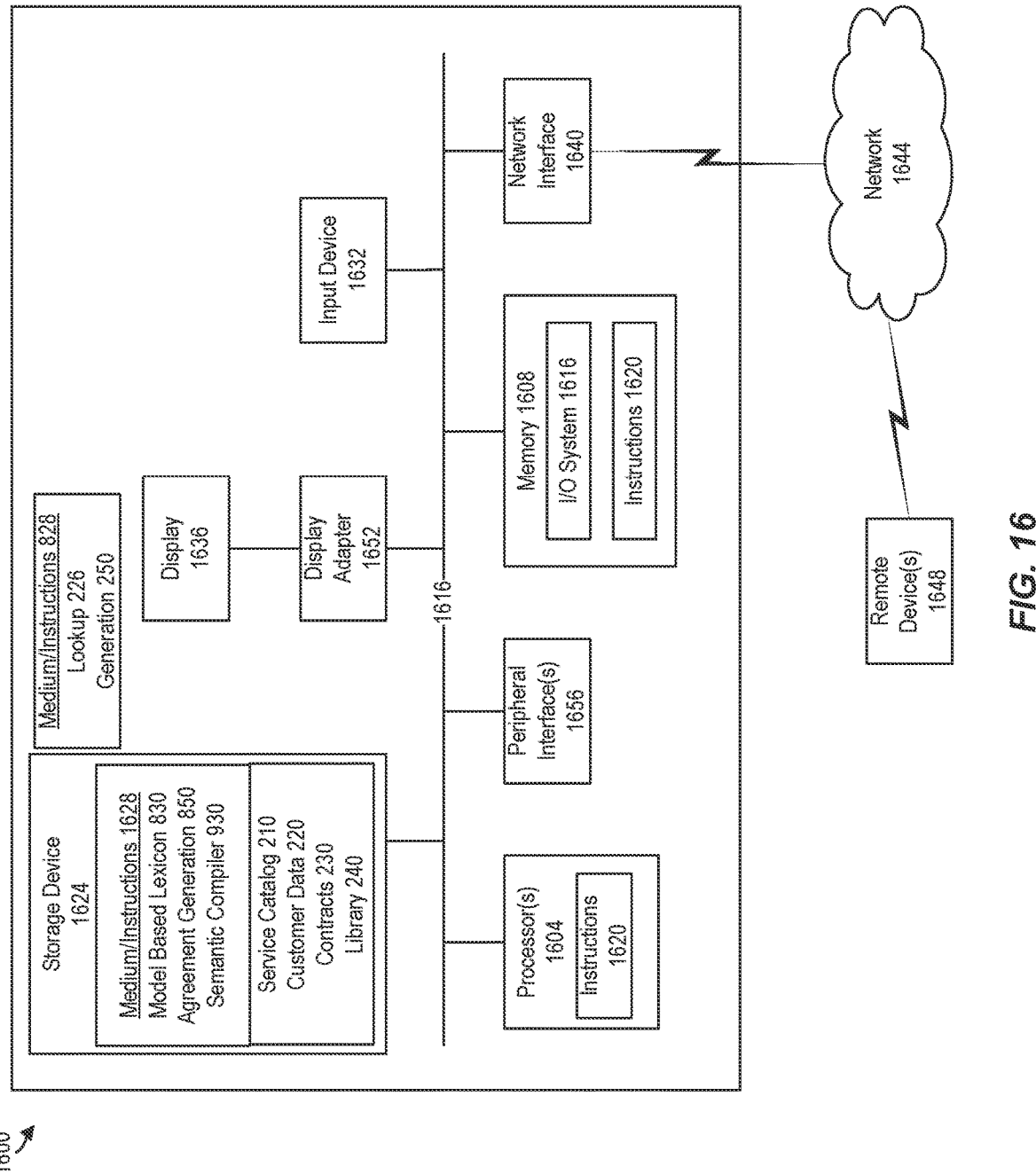
FIG. 16 is a block diagram of a processing system suitable for implementing the disclosed technology.

FIG. 16 illustrates a diagram of a general-purpose network component or computer system. The system 1600 may comprise any one or more of the nodes illustrated in FIG. 1, the controller of FIG. 1, and/or the BSS/OSS of FIG. 1. Computer system 1600 includes a processor 1604 and a memory 1608 that communicate with each other, and with other components, via a bus 1612. Bus 1612 may include any of several types of bus structures including, but not limited to, a memory bus, a memory controller, a peripheral bus, a local bus, and any combinations thereof, using any of a variety of bus architectures.

Memory 1608 may include various components (e.g., machine-readable media) including, but not limited to, a random access memory component, a read only component, and any combinations thereof. In one example, a basic input/output system 1616 (BIOS), including basic routines that help to transfer information between elements within computer system 1600, such as during start-up, may be stored in memory 1608. Memory 1608 may also include (e.g., stored on one or more machine-readable media) instructions (e.g., software) 1620 embodying any one or more of the aspects and/or methodologies of the present disclosure. In another example, memory 1608 may further include any number of program modules including, but not limited to, an operating system, one or more application programs, other program modules, program data, and any combinations thereof.

Computer system 1600 may also include a storage device 1624. Examples of a storage device (e.g., storage device 1624) include, but are not limited to, a hard disk drive, a magnetic disk drive, an optical disc drive in combination with an optical medium, a solid-state memory device, and any combinations thereof. Storage device 1624 may be connected to bus 1612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1624 (or one or more components thereof) may be removably interfaced with computer system 1600 (e.g., via an external port connector (not shown)). Particularly, storage device 1624 and an associated machine-readable medium 1628 may provide nonvolatile and/or volatile storage of machine-readable instructions, data structures, program modules, and/or other data for computer system 1600. In one example, software 1620 may reside, completely or partially, within machine-readable medium 1628. In another example, software 1620 may reside, completely or partially, within processor 1604.

As illustrated in FIG. 16, the storage device may include instructions to cause a processer to perform the functions of the customer/SLA lookup engine 226 and the packet generation engine 250. The storage device 1624 may also include the service catalog 210, customer data database 2120, agreements database 230 and the template library 240.

Computer system 1600 may also include an input device 1632. In one example, a user of computer system 1600 may enter commands and/or other information into computer system 1600 via input device 1632. Examples of an input device 1632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1632 may be interfaced to bus 1612 via any of a variety of interfaces (not shown) including, but not limited to, a serial interface, a parallel interface, a game port, a USB interface, a FIREWIRE interface, a direct interface to bus 1612, and any combinations thereof. Input device 1632 may include a touch screen interface that may be a part of or separate from display 1636, discussed further below. Input device 1632 may be utilized as a user selection device for selecting one or more graphical representations in a graphical interface as described above.

A user may also input commands and/or other information to computer system 1600 via storage device 1624 (e.g., a removable disk drive, a flash drive, etc.) and/or network interface device 1640. A network interface device, such as network interface device 1640, may be utilized for connecting computer system 1600 to one or more of a variety of networks, such as network 1644, and one or more remote devices 1648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1644, may employ a wired and/or a wireless mode of communication. In general, any network topology may be used. Information (e.g., data, software 1620, etc.) may be communicated to and/or from computer system 1600 via network interface device 1640.

It should be recognized that the packet contract thus comprises a command block and/or a metadata block that may contain one or more conditions and one or more conditional actions. For example, the command/metadata block contains one or more SLOs indicating network service boundaries/thresholds and one or more KPI indicating network service metrics that can be employed to test compliance with the SLO. However, the command/metadata block may also carry one or more conditional commands/actions to be executed for other purposes. For example, some conditional commands can instruct the network device to perform associated conditional actions, such as dropping the packet, updating packet metadata, sending an alert, attesting that SLO has not been violated, delaying a packet or prioritizing packet flows from a customer or for a particular service of the customer, etc.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid-state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A computer implemented method of generating network service accounting data, comprising:
   accessing a network service agreement specifying network services in electronic form;
   parsing the network service agreement using a constrained language model and determining one or more network services that are specified by the network service agreement;
   determining one or more service level agreements (SLAs) for each network service of the one or more network services;
   determining one or more service level objectives (SLOs) for each SLA of the one or more SLAs;
   determining one or more service level values (SLVs) for each SLO of the one or more SLOs;
   selecting a metric associated with each SLV to be measured to determine compliance with the one or more SLOs;
   storing the one or more SLAs, the one or more SLOs, the one or more SLVs, and the metrics as reusable data objects; and
   upon receipt of a network flow, generating conditional directives for insertion in the flow from the reusable data objects to determine compliance with the one or more SLAs, the conditional directives generated from a template associated with the one or more SLAs and specifying a format for the conditional directives in the form of a packet contract.

2. The computer implemented method of claim 1 wherein the computer implemented method further includes generating and storing one or more templates for a packet contract, the one or more templates comprising at least one of instructions, conditional directives, or metadata to generate accounting data for a packet in an adaptive service level accounting system.

3. The computer implemented method of claim 1 further including generating a service subscription for a customer and storing the service subscription as a reusable data object.

4. The computer implemented method of claim 1 wherein the computer implemented method further includes triggering an admission gateway of an adaptive service level accounting system.

5. The computer implemented method of claim 1 wherein the one or more SLAs, the one or more SLOs, the one or more SLVs, and the metrics, are created by translating the network service agreement using a constrained lexicon having a restricted vocabulary and specified grammar rules.

6. The computer implemented method of claim 1 wherein the determining the one or more network services is performed using a model-based lexicon which includes at least one information model and one or more data models derived from the information model.

7. The computer implemented method of claim 6 wherein the determining the one or more network services is performed using the model-based lexicon further includes one or more domain ontologies.

8. The computer implemented method of claim 6 wherein the determining the one or more network services is performed by applying formal logic to the model-based lexicon.

9. A processing device, comprising:
   a non-transitory memory storing instructions; and
   at least one processor in communication with the memory, the at least one processor configured, upon execution of the instructions, to perform the following steps:
   parse a network service agreement using a constrained language model and determining one or more network services that are specified by the network service agreement, the network service agreement specifying network services in electronic form;
   determine one or more service level agreements (SLAs) for each network service of the one or more network services;
   determine one or more service level objectives (SLOs) for each SLA of the one or more SLAs;
   determine one or more service level values (SLVs) for each SLO of the one or more SLOs;
   select a metric associated with each SLV to be measured to determine compliance with the one or more SLOs;
   store the one or more SLAs, the one or more SLOs, the one or more SLVs, and the metrics as reusable data objects; and
   upon receipt of a network flow, generate conditional directives for insertion in the flow from the reusable data objects to determine compliance with the one or more SLAs, the conditional directives generated from a template associated with the one or more SLAs and specifying a format for the conditional directives in the form of a packet contract.

10. The processing device of claim 9 wherein the at least one processor further executes the instructions to:
   determine the one or more network services and recognize one or more named entities in the network service agreement that interact with the one or more network services; and
   identify elements of a SLO, a SLV, and/or a metric.

11. The processing device of claim 9 wherein the at least one processor further executes the instructions to construct metrics and associate each generated metric with an SLV.

12. The processing device of claim 9 wherein the at least one processor further executes the instructions to generate a service subscription for a customer and store the service subscription as a reusable data object.

13. The processing device of claim 9 wherein the at least one processor further executes the instructions to access a new network service agreement defining a new customer of a network service provider or to clarify terms in another network service agreement.

14. A non-transitory computer-readable medium storing computer instructions to generate processing objects translated from network service agreements, that configure at least one processor, upon execution of the instructions, to perform the following steps:
   accessing a network service agreement specifying network services in electronic form;
   parsing the network service agreement using a constrained language model and determining one or more network services that are specified by the network service agreement;
   determining one or more service level agreements (SLAs) for each network service of the one or more network services;
   determining one or more service level objectives (SLOs) for each SLA of the one or more SLAs;
   determining one or more service level values (SLVs) for each SLO of the one or more SLOs;
   selecting a metric associated with each SLV to be measured to determine compliance with the one or more SLAs;
   storing the one or more SLAs, the one or more SLOs, the one or more SLVs, and the metrics as reusable data objects; and
   upon receipt of a network flow, generating conditional directives for insertion in the flow from the reusable data objects to determine compliance with the one or more SLAs, the conditional directives generated from a template associated with the one or more SLAs and specifying a format for the conditional directives in the form of a packet contract.

15. The non-transitory computer-readable medium of claim 14 wherein the determining comprises:
   recognizing one or more named entities in the network service agreement that interact with the one or more network services; and
   identifying elements of the one or more SLAs, the one or more SLOs, the one or more SLVs, and/or the metrics using the named entities.

16. The non-transitory computer-readable medium of claim 14 wherein the steps further include identifying one or more key values for metrics associated with a first SLV for measuring conformance with the first SLV.

17. The non-transitory computer-readable medium of claim 14 further includes associating each metric with a SLV.

18. The non-transitory computer-readable medium of claim 14 further including generating a service subscription for a customer and storing the service subscription as a reusable data object.

19. The non-transitory computer-readable medium of claim 14 wherein the accessing comprises accessing a new network service agreement defining a new customer of a network service provider or clarifying terms in another network service agreement.

20. The non-transitory computer-readable medium of claim 14 wherein the one or more SLAs, the one or more SLOs, the one or more SLVs, and the metrics are created by translating the network service agreement using a constrained lexicon having a restricted vocabulary and specified grammar rules.

* * * * *